(12) United States Patent
Jang

(10) Patent No.: US 12,423,225 B2
(45) Date of Patent: Sep. 23, 2025

(54) MEMORY CONTROLLER FOR CONTROLLING MEMORY DIES AND MEMORY SYSTEM INCLUDING THE MEMORY CONTROLLER

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/391,654

(22) Filed: Dec. 21, 2023

(65) Prior Publication Data
US 2025/0013563 A1    Jan. 9, 2025

(30) Foreign Application Priority Data
Jul. 7, 2023 (KR) .................. 10-2023-0088374

(51) Int. Cl.
*G06F 12/00* (2006.01)
*G06F 12/02* (2006.01)

(52) U.S. Cl.
CPC .. *G06F 12/0246* (2013.01); *G06F 2212/7201* (2013.01)

(58) Field of Classification Search
CPC .................. G06F 12/0246; G06F 2212/7201

USPC ......................................................... 711/103
See application file for complete search history.

(56) References Cited

U.S. PATENT DOCUMENTS

| 9,432,192 | B1 * | 8/2016 | Pogde | H04L 9/0836 |
| 2015/0178149 | A1 * | 6/2015 | Cai | G06F 11/108 |
| | | | | 714/766 |
| 2017/0168716 | A1 * | 6/2017 | Shaharabany | G06F 3/0679 |

FOREIGN PATENT DOCUMENTS

| JP | H07109614 B2 * | 11/1995 | |
| KR | 10-2012-0038809 A | 4/2012 | |
| KR | 10-2016-0048682 A | 5/2016 | |
| TW | 202129501 A * | 8/2021 | G06F 12/0246 |

\* cited by examiner

*Primary Examiner* — Mardochee Chery
(74) *Attorney, Agent, or Firm* — IP & T GROUP LLP

(57) ABSTRACT

A memory system includes: a plurality of memory dies each including a plurality of memory blocks each including a plurality of pages, each of the memory dies being configured to store therein map data having a tree structure and a memory controller configured to organize super blocks each including memory blocks from the respective memory dies, configured to control an operation of copying data from a first memory block to a second memory block among the plurality of memory blocks and configured to update the map data according to the operation.

13 Claims, 21 Drawing Sheets

FIG. 7

Super Block Table 220

|  | EW count | Read count | Root node Address |
|---|---|---|---|
| SPBLK0 | 100 | 300 | ADDR10 |
| SPBLK1 | 200 | 200 | ADDR20 |
| SPBLK2 | 50 | 100 | ADDR30 |
| SPBLK3 | 80 | 50 | ADDR40 |

MEMORY CONTROLLER FOR CONTROLLING MEMORY DIES AND MEMORY SYSTEM INCLUDING THE MEMORY CONTROLLER

CROSS-REFERENCE TO RELATED APPLICATION

The present application claims priority under 35 U.S.C. § 119(a) to Korean patent application number 10-2023-0088374 filed on Jul. 7, 2023, the entire disclosure of which is incorporated by reference herein.

BACKGROUND

1. Field of Invention

Embodiments of the present disclosure generally relate to an electronic device, and more particularly, to a memory controller and a memory system including the same.

2. Description of Related Art

A memory system is a device which stores data under the control of a host device such as a computer or a smart phone. The memory system may include a memory device for storing data and a memory controller for controlling the memory device. The memory device is classified into a volatile memory device and a nonvolatile memory device.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

The nonvolatile memory device may include a plurality of memory blocks. The nonvolatile memory device may perform a data movement operation of storing data stored in a memory block among the plurality of memory blocks into another memory block. When a position at which data is stored is changed, map data representing a corresponding relationship between a physical address representing the position at which the data is stored in the nonvolatile memory device and a logical address provided by a host may be updated.

SUMMARY

Various embodiments of the present disclosure provide a memory controller and a memory system, which can increase a speed at which map data used for an operation of the memory system is searched and stored.

In accordance with an embodiment of the present disclosure, there is provided a memory system including: a plurality of memory dies each including a plurality of memory blocks each including a plurality of pages, each of the memory dies being configured to store therein map data having a tree structure; and a memory controller configured to organize super blocks each including memory blocks from the respective memory dies, configured to control an operation of copying data from a first memory block to a second memory block among the plurality of memory blocks and configured to update the map data according to the operation, wherein the map data includes root nodes respectively identifying the super blocks, die nodes respectively identifying the plurality of memory dies, and page nodes respectively identifying the plurality of pages.

In accordance with another embodiment of the present disclosure, there is provided a memory controller including: a buffer memory configured to store map data having a tree structure, the map data being read from a plurality of memory dies each including a plurality of memory blocks each including a plurality of pages; and a processor configured to organize super blocks each including two or more of the plurality of memory blocks from each of the memory dies, and configured to control, based on the map data, an operation on a memory block among the plurality of memory blocks, wherein the map data includes root nodes respectively identifying the super blocks, die nodes respectively identifying the plurality of memory dies, block nodes respectively identifying the plurality of memory blocks, and page nodes respectively identifying the plurality of pages.

In accordance with another embodiment of the present disclosure, there is provided an operating method of a controller, the operating method including: updating map data of a tree structure including a hierarchy of: root nodes representing respective super blocks, intermediate nodes for a corresponding root node of the root nodes and representing respective memory dies related to a corresponding super block of the super blocks, and leaf nodes for a corresponding intermediate node of the intermediate nodes and representing respective pages included in a corresponding memory die of the memory dies, wherein the updating the map data includes: identifying, based on a memory block address, a selected root node of the root nodes and a selected intermediate node of the intermediate nodes corresponding to the selected root node; identifying, based on a page address, a selected leaf node of the leaf nodes corresponding to the selected intermediate node; and updating an entry associated to the selected leaf node, the entry representing a mapping relationship between a logical address and the page address.

In accordance with another embodiment of the present disclosure, there is provided an operating method of a controller, the operating method including: updating map data of a tree structure including a hierarchy of:
  root nodes representing respective super blocks, superior nodes for a corresponding root node of the root nodes and representing respective memory dies related to a corresponding super block of the super blocks, inferior nodes for a corresponding superior node of the superior nodes and representing respective memory blocks included in a corresponding memory die of the memory dies, and leaf nodes for a corresponding inferior node of the inferior nodes and representing respective pages included in a corresponding memory block of the memory blocks, wherein the updating the map data includes: identifying, based on a memory block address, a selected root node of the root nodes, a selected superior node of the superior nodes corresponding to the selected root node and a selected inferior node of the inferior nodes corresponding to the selected superior node; identifying, based on a page address, a selected leaf node of the leaf nodes corresponding to the selected inferior node; and updating an entry associated to the selected leaf node, the entry representing a mapping relationship between a logical address and the page address.

BRIEF DESCRIPTION OF THE DRAWINGS

Embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 7 is a diagram illustrating a super block table in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
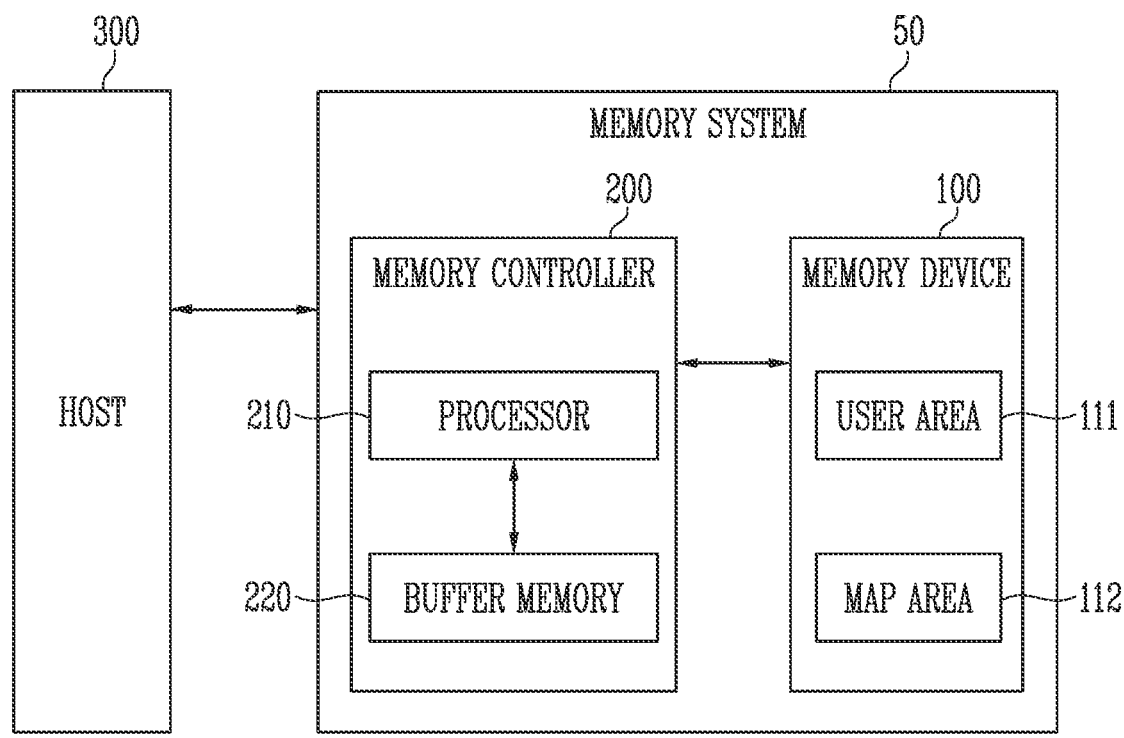
FIG. 1 is a diagram illustrating a memory system including a memory controller and a memory system in accordance with an embodiment of the present disclosure.

FIG. 1 is a diagram illustrating a memory system including a memory controller and a memory system in accordance with an embodiment of the present disclosure.

Referring to FIG. 1, the memory system 50 may include a memory device 100 and a memory controller 200. The memory system 50 may be a device which is included in a mobile phone, a computer, an in-vehicle infotainment, or the like, and stores data under the control of a host 300 as an external device.

The memory system 50 may be manufactured as any of various types of storage devices such as a Solid State Drive (SSD) and a Universal Flash Storage (UFS) according to a host interface as a communication scheme with the host 300. The memory system 50 may be manufactured as any of various package types such as a System On Chip (SoC).

The memory device 100 may store data. The memory device 100 may operate under the control of the memory controller 200. In an embodiment, the memory device 100 may be a nonvolatile memory device or a volatile memory device.

The memory device 100 may receive a command and an address from the memory controller 200, and perform an operation instructed by the command on an area selected by the address. The memory device 100 may perform a program operation (write operation) of storing data in the area selected by the address, a read operation of reading data from the area selected by the address, or an erase operation of erasing data in the area selected by the address.

The memory controller 200 may control overall operations of the storage system 50.

When power is applied to the memory system 50, the memory controller 200 may execute firmware (FW). In an embodiment, the memory controller 200 may control communication between the host 300 and the memory device 100 by executing the FW. In an embodiment, the memory controller 200 may translate a logical address of the host 300 into a physical address of the memory device 100.

The memory controller 200 may control the memory device 100 to perform a program operation, a read operation, an erase operation, or the like in response to a request of the host 300. The memory controller 200 may provide a command, a physical address or data to the memory device 100 according to a write operation, a read operation or an erase operation.

In an embodiment, the memory controller 200 may autonomously generate a command, an address, and data, regardless of receiving a request from the host 300, and transmit the command, the address, and the data to the memory device 100. For example, the memory controller 200 may provide the memory device 100 with a command, an address, and data, which are used to perform read and program operations accompanied in performing wear leveling, read reclaim, garbage collection, and the like.

In an embodiment, the memory controller 200 may control at least two memory devices 100. The memory controller 200 may control the memory devices 100 according to an interleaving scheme to improve operational performance. The interleaving scheme may be a scheme for controlling operations on at least two memory devices 100 to overlap with each other.

In an embodiment, the memory controller 200 may include a processor 210 and a buffer memory 220.

The processor 210 may control operations of the memory controller 200 and the memory device 100. The processor 210 may control a program operation of storing received data in the memory device 100 according to a write request of the host 300. The processor 210 may control a read operation of reading data stored in the memory device 100 in response to a read request of the host 300.

In an embodiment, the processor 210 may control a data movement operation of copying data from one memory block to another memory block among a plurality of memory blocks included in the memory device 100. In an embodiment, the data movement operation may be wear leveling, read reclaim or garbage collection.

As a position at which data is stored is changed in the data movement operation, the processor 210 may perform a map update operation of updating map data representing a corresponding relationship between a physical address representing the position at which the data is stored in the memory device 100 and a logical address as an address provided by the host 300. In an embodiment, the physical address may be a block address representing an address of a memory block or a page address representing an address of a page included in the memory block.

For example, in the data movement operation, the processor 210 may copy data from a first page among a plurality of pages included in one memory block to a second page among a plurality of pages included in another memory block, and map, to an address of the second page, a first logical address mapped to an address of the first page.

The buffer memory 220 may temporarily store data provided from the host 300 or temporarily store data read from the memory device 100. In an embodiment, the buffer memory 220 may be a volatile memory device. For example, the buffer memory 220 may be a Dynamic Random Access Memory (DRAM) or a Static Random Access Memory (SRAM). In an embodiment, the buffer memory 220 may be located inside the memory controller 200 or be located outside the memory controller 200.

In an embodiment, the buffer memory 220 may store meta data. The meta data may be data including information used for an operation of the memory system 50. In an embodiment, the meta data may include map data representing a corresponding relationship between a logical address of the host 300 and a physical address of the memory device 100. The map data may be read from a map area 112.

In an embodiment, the meta data may include an erase or write count information and read count information. The erase or write count information may be information on a number of times that an erase operation or a program operation is performed on super blocks included in the memory device 100. The read count information may be information on a number of times that a read operation is performed on super blocks included in the memory device 100. The erase or write count information and the read count information may be read from the map area 112.

In an embodiment, the memory device 100 may include a user area 111 and the map area 112. The user area 111 may be an area in which data received from the host 300 is stored. The user area 111 may include super blocks including a plurality of memory blocks.

The map area 112 may be an area in which meta data is stored. In an embodiment, the map data stored in the map area 112 may be updated by the processor 210.

The host 300 may communicate with the memory system 50, using various communication schemes.

Figure 2:
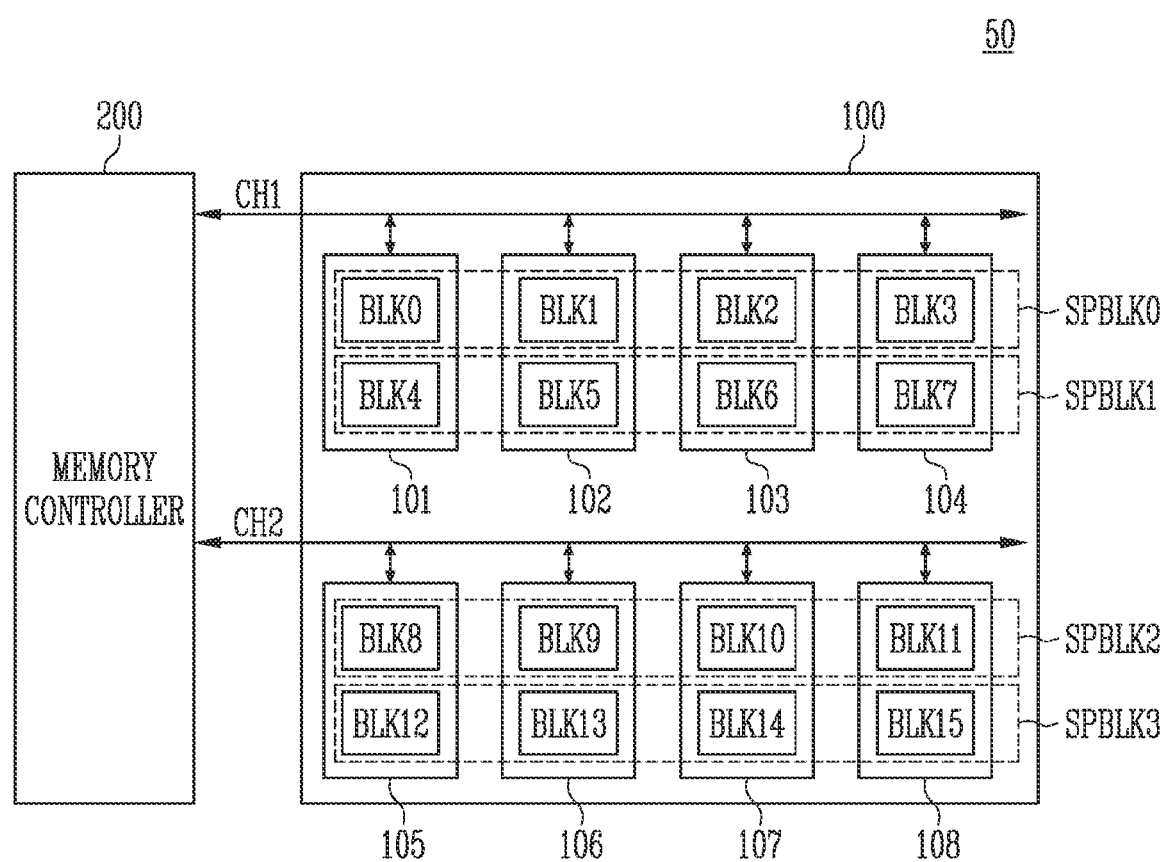
FIG. 2 is a diagram illustrating super blocks including a plurality of memory blocks in accordance with an embodiment of the present disclosure.

FIG. 2 is a diagram illustrating super blocks including a plurality of memory blocks in accordance with an embodiment of the present disclosure.

Figure 3:
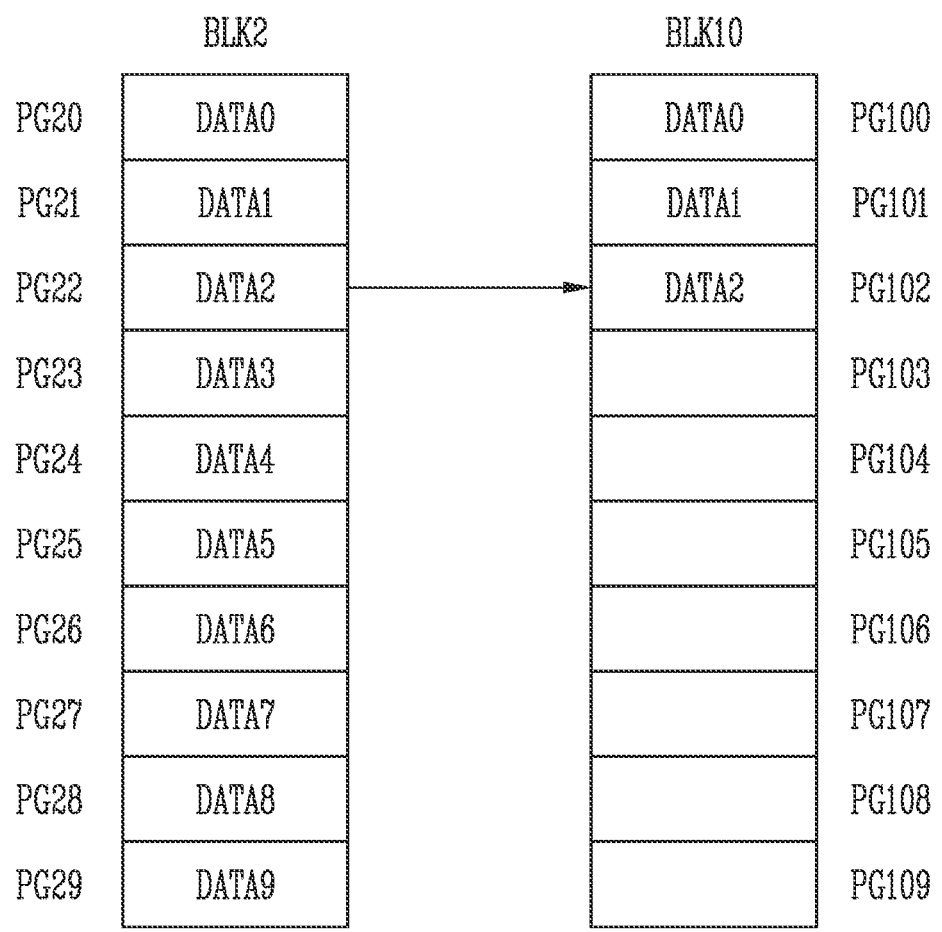
FIG. 3 is a diagram illustrating a data movement operation of copying data from one memory block to another memory block in accordance with an embodiment of the present disclosure.

Referring to FIG. 2, the memory device 100 shown in FIG. 1 may be configured with a plurality of memory dies 101 to 108. The plurality of memory dies 101 to 108 may include a plurality of memory blocks BLK0 to BLK15. In FIG. 2, for convenience of description, a case where each of the plurality of memory dies 101 to 108 includes two memory blocks is described as an example. However, other numbers of memory blocks may also be included in each of the plurality of memory dies 101 to 108. The memory controller 200 may be connected to the plurality of dies 101 to 108 through first and second channels CH1 and CH2. In an embodiment, the number of channels or the number of memory dies connected to each channel are not limited as shown in FIG. 3, and may be variously changed.

Zeroth to third memory dies 101 to 104 may be commonly connected to the first channel CH1. The zeroth to third memory dies 101 to 104 may communicate with the memory controller 200 through the first channel CH1. Fourth to seventh memory dies 105 to 108 may be commonly connected to the second channel CH2. The fourth to seventh memory dies 105 to 108 may communicate with the memory controller 200 through the second channel CH2.

The memory system 50 configured with a plurality of memory dies may perform an operation, using an interleaving scheme. The interleaving scheme may be a scheme of reading or storing data from each of a plurality of memory dies in a structure in which the plurality of memory dies share one channel. In an embodiment, the memory controller 200 may distribute and allocate data corresponding to successive logical addresses respectively to a plurality of memory dies.

In an embodiment, the memory controller 200 may transmit a command, an address, and data to the zeroth memory die 101 through the first channel CH1. The memory controller 200 may transmit a command, an address, and data to the first memory die 102 while the zeroth memory die 101 receives the data to perform a program operation.

In an embodiment, the memory controller 200 may organize super blocks. Each of the supper blocks may include at least one memory blocks included in different memory dies. In an embodiment, the memory controller 200 may organize, as a zeroth super block SPBLK0 and a first super block SPBLK1, at least one memory blocks respectively included in the zeroth to third memory dies 101 to 104. In an embodiment, the zeroth super block SPBLK0 may be configured with a zeroth memory block BLK0 included in the zeroth memory die 101, a first memory block BLK1 included in the first memory die 102, a second memory block BLK2 included in the second memory die 103, and a third memory block BLK3 included in the third memory die 104.

In another embodiment, the memory controller 200 may organize, as a second super block SPBLK2 and a third super block SPBLK3, at least one memory blocks respectively in the fourth to seventh memory dies. In an embodiment, the second super block SPBLK2 may be configured with an eighth memory block BLK8 included in the fourth memory die 105, a ninth memory block BLK9 included in the fifth memory die 106, a tenth memory block BLK10 included in the sixth memory die 107, and an eleventh memory block BLK11 included in the seventh memory die 108. The zeroth to third super blocks SPBLK0 to 3 may be included in the user area 111 shown in FIG. 1.

FIG. 3 is a diagram illustrating a data movement operation of copying data from one memory block to another memory block in accordance with an embodiment of the present disclosure.

Referring to FIG. 3, the memory system 50 may perform a data movement operation of copying data from the second memory block BLK2 to the tenth memory block BLK10. The second memory block BLK2 may be included in the zeroth super block SPBLK0 as shown in FIG. 2. The second memory block BLK2 may include twentieth to twenty-ninth pages PG20 to PG29. The tenth memory block BLK10 may be included in the second super block SPBLK2 as shown in FIG. 2. The tenth memory block BLK10 may include hundredth to hundred-and-ninth pages PG100 to PG109. In an embodiment, the second memory block BLK2 and the tenth memory block BLK10 may be memory blocks included in the user area 111.

In an embodiment, the memory system 50 may perform the data movement operation, based on erase or write count information and read count information. In an embodiment, the memory system 50 may perform the data movement operation, based on a number of valid pages included in a plurality of memory blocks.

Specifically, the memory system 50 may store zeroth and first data DATA0 and DATA1 stored in the twentieth and twenty-first pages PG20 and PG21 in the hundredth and hundred-and-first pages PG100 and PG101. After that, the memory system 50 may store second data DATA2 stored in the twenty-second page PG22.

Since a position at which the second data DATA2 is stored has been changed, the memory system 50 may perform a map update operation of updating map data representing a corresponding relationship between a physical address representing the position at which the second data DATA2 is stored and a logical address of the host. The map update operation will be described with reference to FIG. 4.

Figure 4:
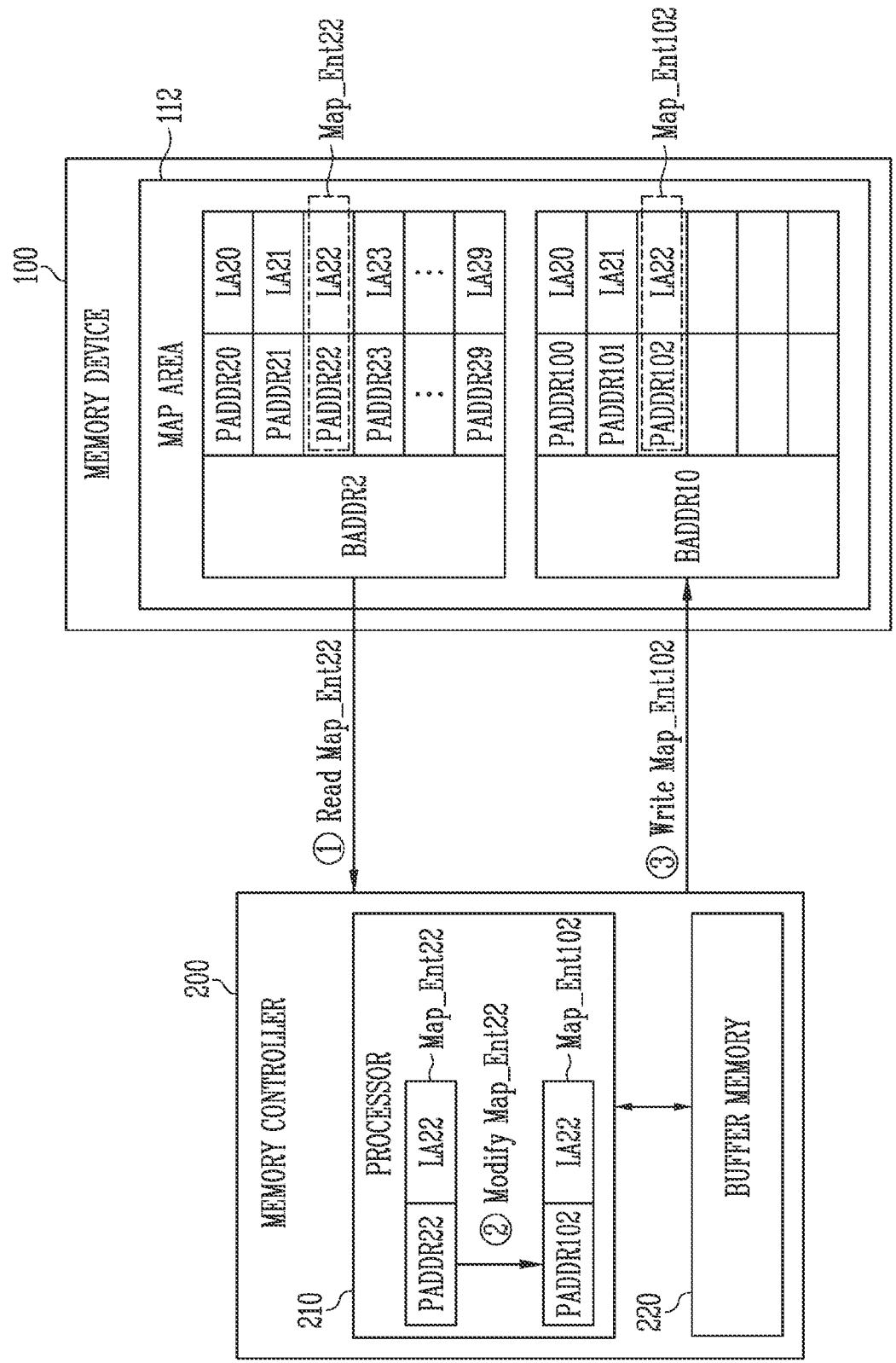
FIG. 4 is a diagram illustrating an operation of updating map data according to a data movement operation in accordance with an embodiment of the present disclosure.

FIG. 4 is a diagram illustrating an operation of updating map data according to a data movement operation in accordance with an embodiment of the present disclosure.

Referring to FIG. 4, the map 112 included in the memory device 100 may store map data. The map data may include a plurality of map entries. A map entry may be data representing a corresponding relationship between a physical address of the memory device 100 and a logical address of the host. The physical address may include a block address representing an address of a memory block and a page address representing an address of a page.

In an embodiment, referring to FIG. 4 together with FIG. 3, the processor 210 may perform a data movement operation of storing in the hundred-and-second page PG102, the second data DATA2 stored in the twenty-second page PG22. In the data movement operation, the processor 210 may read a twenty-second map entry Map_Ent22 (① Read Map_Ent22). The twenty-second map entry Map_Ent22 may be data representing a corresponding relationship between a twenty-second page address PADDR22 and a twenty-second logical address LA22. The twenty-second page address PADDR22 may be an address of the twenty-second page PG22 in which the second data DATA2 is stored.

The processor 210 may modify the twenty-second map entry Map_Ent22 (② Modify Map_Ent22). Specifically, the processor 210 may map, to a hundred-and-second page address PADDR102, the twenty-second logical address LA22 mapped to the twenty-second address PADDR22. The processor 210 may modify the twenty-second map entry Map_Ent22 in which the twenty-second page address PADDR22 and the twenty-second logical address LA22 are mapped to each other as a hundred-and-second map entry Map_Ent102 in which the hundred-and-second page address PADDR102 and the twenty-second logical address LA22 are mapped to each other. The hundred-and-second map entry Map_Ent102 may be an address of the hundred-and-second page PG102 in which the second data DATA is to be stored.

After that, the processor 210 may store the hundred-and-second map entry Map_Ent102 in the map area 112 (③ Write Map_Ent102). In an embodiment, the hundred-and-second map entry Map_Ent102 may be temporarily stored in the buffer memory 220 before the hundred-and-second map entry Map_Ent102 is stored in the map area 112.

Figure 5:
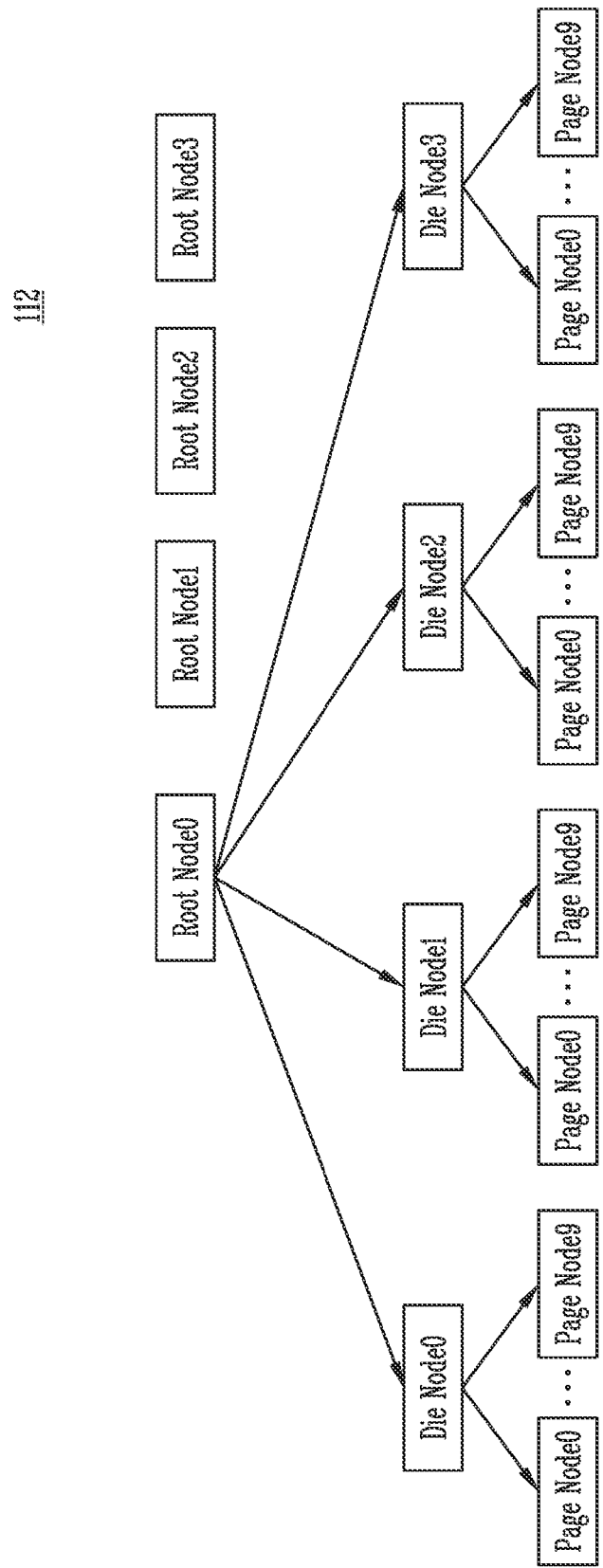
FIG. 5 is a diagram illustrating map data having a tree structure in accordance with an embodiment of the present disclosure.

FIG. 5 is a diagram illustrating map data having a tree structure in accordance with an embodiment of the present disclosure.

FIG. 5 will be described with reference to FIGS. 2 and 3. Referring to FIG. 5, the map data may be data having a tree structure. In an embodiment, the map data may include root nodes, die nodes, and page nodes. The root nodes may be nodes identifying respective super blocks each including a plurality of memory blocks. The die nodes may be nodes identifying respective memory dies each including a plurality of memory blocks. The page nodes may be nodes identifying respective pages included in each of the memory blocks.

In an embodiment, the map data may include zeroth to third root nodes Root Node0 to 3. The zeroth to third root nodes Root Node0 to 3 may respectively correspond to the zeroth to third super blocks SPBLK0 to 3.

In an embodiment, zeroth to third die nodes Die Node0 to 3 may be nodes associated with the zeroth root node Root Node0. The zeroth to third die nodes Die Node0 to 3 may respectively correspond to the memory blocks constituting the zeroth super block SPBLK0. Specifically, the zeroth to third die nodes Die Node0 to 3 may respectively correspond to the zeroth memory block BLK0, the first memory block BLK1, the second memory block BLK2, and the third memory block BLK3, which constitute the zeroth super block SPBLK0 shown in FIG. 2.

In an embodiment, zeroth to ninth page nodes Page Node0 to 9 may be nodes associated with the zeroth to third die nodes Die Node0 to 3. The zeroth to ninth page nodes Page Node0 to 9 may respectively correspond to the plurality of pages included in the memory blocks constituting the zeroth super block SPBLK0. In an embodiment, zeroth to ninth page nodes Page Node0 to 9 associated with the second die node Die Node2 may respectively correspond to the twentieth to twenty-ninth pages PG20 to PG29 included in the second memory block BLK2 shown in FIGS. 2 and 3. The memory controller 200 may read a map entry in which a page address and a logical address are mapped to each other, using the map data having the tree structure. An operation of reading a map entry will be described later with reference to FIG. 6.

Figure 6:
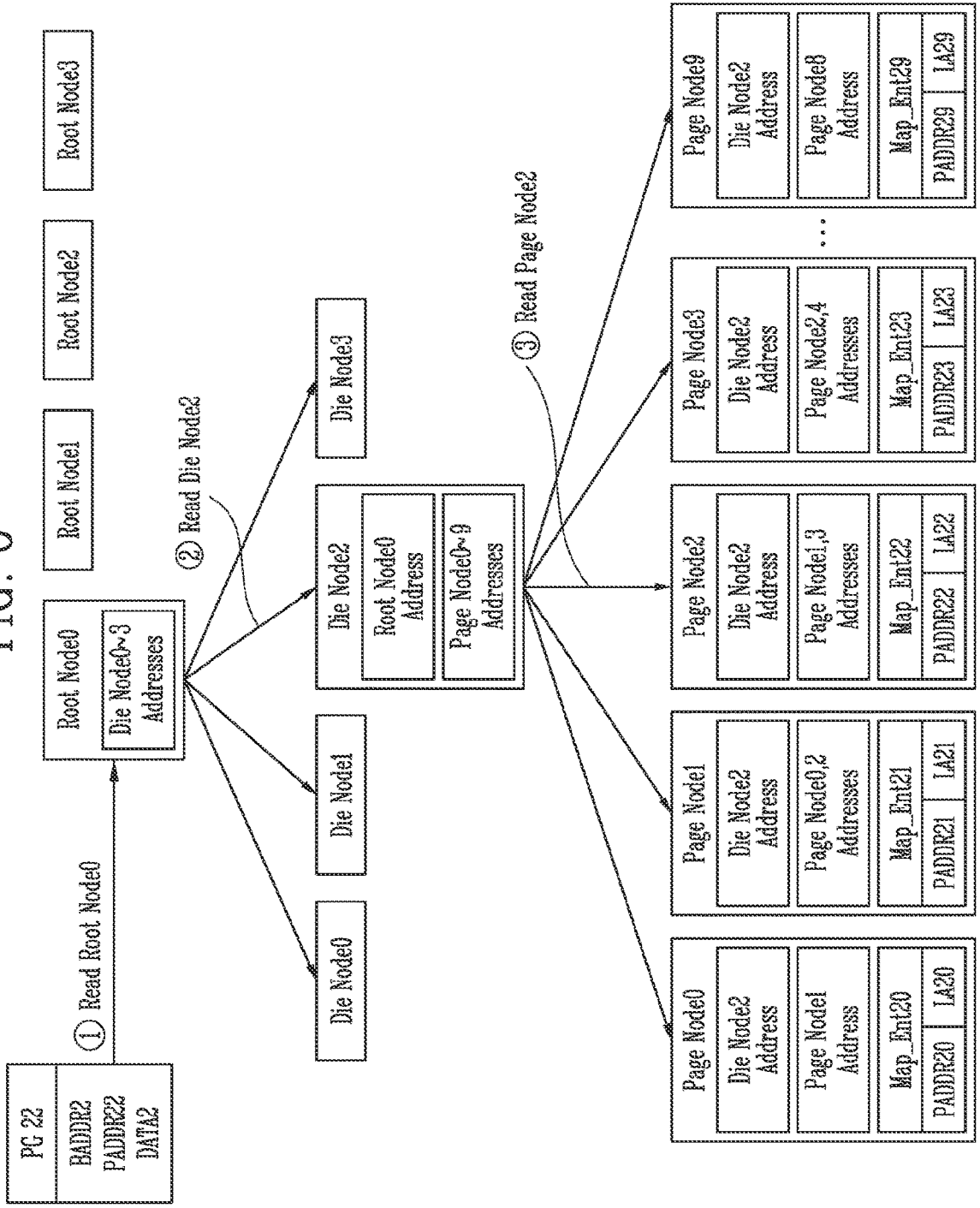
FIG. 6 is a diagram illustrating an operation of searching for a logical address corresponding to an address of a page in the map data having the tree structure in accordance with an embodiment of the present disclosure.

FIG. 6 is a diagram illustrating an operation of searching for a logical address corresponding to an address of a page in the map data having the tree structure in accordance with an embodiment of the present disclosure.

FIG. 6 will be described with reference to FIGS. 2 to 4. In FIG. 6, a case where the second data DATA2 stored in the twenty-second page PG22 is read and the twenty-second map entry Map_Ent22 including the twenty-second page address PADDR22 is read will be described as an example. Referring to FIG. 6, the memory controller 200 may identify the zeroth super block SPBLK0 including the second memory block BLK2, based on a second block address BADDR2 of the second memory block BLK2 including the twenty-second page PG22.

In an embodiment, when a super block is configured with memory blocks included in four memory dies as shown in FIG. 2, the memory controller 200 may identify, as the super block including the second memory block, a quotient according to a result obtained by dividing the block address of the second memory block by 4. Specifically, the block address of the second memory block is 2 as the second block address BADDR2, and therefore, a quotient according to a result obtained by dividing 2 by 4 may be 0. Since the quotient is 0, the memory controller 200 may identify that the super block including the second memory block is the zeroth super block. The memory controller 200 may read a zeroth root node Root Node0 corresponding to the zeroth super block.

The zeroth root node Root Node0 may include addresses of die nodes associated with the zeroth root node. The addresses of the die nodes may be addresses representing positions at which the die nodes are stored. In an embodiment, the die nodes associated with the zeroth root may be zeroth to third die nodes Die Node0 to 3. In an embodiment, this will be described with reference to FIG. 2. The zeroth die node Die Node0 may be included in the zeroth super block SPBLK0, and correspond to the zeroth memory block BLK0 included in the zeroth memory die 101. The first die node Die Node1 may be included in the zeroth super block SPBLK0, and correspond to the first memory block BLK1 included in the first memory die 102. The second die node Die Node2 may be included in the zeroth super block SPBLK0, and correspond to the second memory block BLK2 included in the second memory die 103. The third die node Die Node3 may be included in the zeroth super block SPBLK0, and correspond to the third memory block BLK3 included in the third memory die 104.

In an embodiment, when a super block is configured with memory blocks included in four memory dies, the memory controller 200 may identify, as the memory die including the second memory block, a remainder according to a result obtained by dividing the block address of the second memory block by 4. Specifically, the block address of the second memory block is 2, and therefore, a remainder according to a result obtained by dividing 2 by 4 may be 2. Since the remainder is 2, the memory controller 200 may identify that the memory die including the second memory block is the second memory die. The memory controller 200 may read the second die node Die Node2 corresponding to the second memory die among the die nodes associated with the zeroth root node.

The memory controller 200 may read the second die node Die Node2 corresponding to the second memory die, based on addresses Die Node0 to 3 Addresses of the zeroth to third die nodes included in the zeroth root node Root Node0.

The second die node Die Node2 may include addresses of page nodes associated with the second die node. The addresses of the page nodes may be addresses representing positions at which the page nodes are stored. In an embodiment, the addresses of the page nodes associated with the second die node may be addresses Page Node0 to 9 Addresses of zeroth to ninth page nodes. In embodiment, the zeroth page node Page Node0 may correspond to the twentieth page included in the second memory block. The zeroth page node Page Node0 may include a twentieth page address PADDR20. The first page node Page Node1 may correspond to the twenty-first page included in the second memory block. The first page node Page Node1 may include a twenty-first page address PADDR21. The second page node Page Node2 may correspond to the twenty-second page included in the second memory block. The second page node Page Node2 may include a twenty-second page address PADDR22. The second die node Die Node2 may include an address Root Node0 Address.

The zeroth to ninth page nodes Page Node0 to 9 may include an address Die Node2 Address of the second die node, a map entry, and addresses of page nodes including page addresses successive to a page address included into the map entry. In an embodiment, the zeroth page node Page Node0 may include the twentieth page address PADDR20 and a twentieth map entry Map_Ent20 to which a twentieth logical address LA20 is mapped. The zeroth page node Page Node0 may include an address Page Node1 Address of the first page node including the twenty-first page address PADDR21 as a page address successive to the twentieth page address PADDR20.

In an embodiment, the second page node Page Node2 may include the twenty-second page address PADDR22 and the twenty-second map entry Map_Ent22 to which the twenty-second logical address LA22 is mapped. The second page node Page Node2 may include the address Page Node1 Address of the first page node including the twenty-first address PADDR21 as a page address successive to the twenty-second page address PADDR22 and an address Page Node3 Address of the third page node including a twenty-third page address PADDR23 as a page address successive to the twenty-second page address PADDR22.

The memory controller 200 may read the zeroth to ninth page nodes Page Node0-9, based on the addresses Page Node0 to 9 Addresses of the zeroth to ninth page nodes included in the second die node Die Node2. The memory controller 200 may identify, based on the twenty-second page address PADDR22, the second page node Page Node2 including the twenty-second page address PADDR22 among the zeroth to ninth page nodes Page Node0 to 9. The memory controller 200 may acquire the twenty-second logical address LA22 corresponding to the twenty-second page address PADDR22 from the twenty-second map entry Map_Ent22 included in the second page node Page Node2.

After that, the memory controller 200 may map, to the hundred-and-second page address, the twenty-second logical address mapped to the second page address to store the second data stored in the twenty-second page included in the second memory block in the hundred-and-second page included in the tenth memory block.

In an embodiment, the memory controller 200 may read, based on a block address of a memory block, a root node corresponding to a super block including the memory block among a plurality of memory blocks. The memory controller 200 may read, based on the block address of the memory block, a die node corresponding to a memory die including the memory block. The memory controller 200 may read a page node corresponding to a page, in which data is stored among a plurality of pages included in the memory block, based on an address of the page and addresses of page nodes included in the die node. The memory controller 200 may acquire, from the read page node, a map entry representing a logical address corresponding to the address of the page.

FIG. 7 is a diagram illustrating a super block table in accordance with an embodiment of the present disclosure.

Referring to FIG. 7, the buffer memory 220 shown in FIG. 1 may store a super block table read from the memory device 100. The super block table may include information on each super block. In an embodiment, the super block table may include erase or write count information EW count, read count information Read count, and an address Root node Address of a root node.

The erase or write count information EW count may be information representing a number of times an erase operation or a program operation on each super block is performed. The read count information Read count may be information representing a number of times a read operation on each super block is performed. The address Root node Address of the root node may be an address representing a position at which a root node corresponding to each super block is stored in the memory device 100. The address Root node Address of the root node may be an address of the map area 112 shown in FIG. 1. The address Root node Address of the root node may be a block address or a page address.

In an embodiment, the memory controller 200 may perform a data movement operation, based on the erase or write count information EW count and the read count information Read count. For example, the memory controller 200 may perform a data movement operation of copying data from the zeroth super block SPBLK1 to the second super block SPBLK2, based on the read count information Read count.

In an embodiment, the memory controller 200 may read a root node corresponding to each super block, based on the super block table. For example, the memory controller 200 may read the zeroth root node, based on a tenth address ADDR10 as an address of the zeroth root node corresponding to the zeroth super block SPBLK0.

Figure 8:
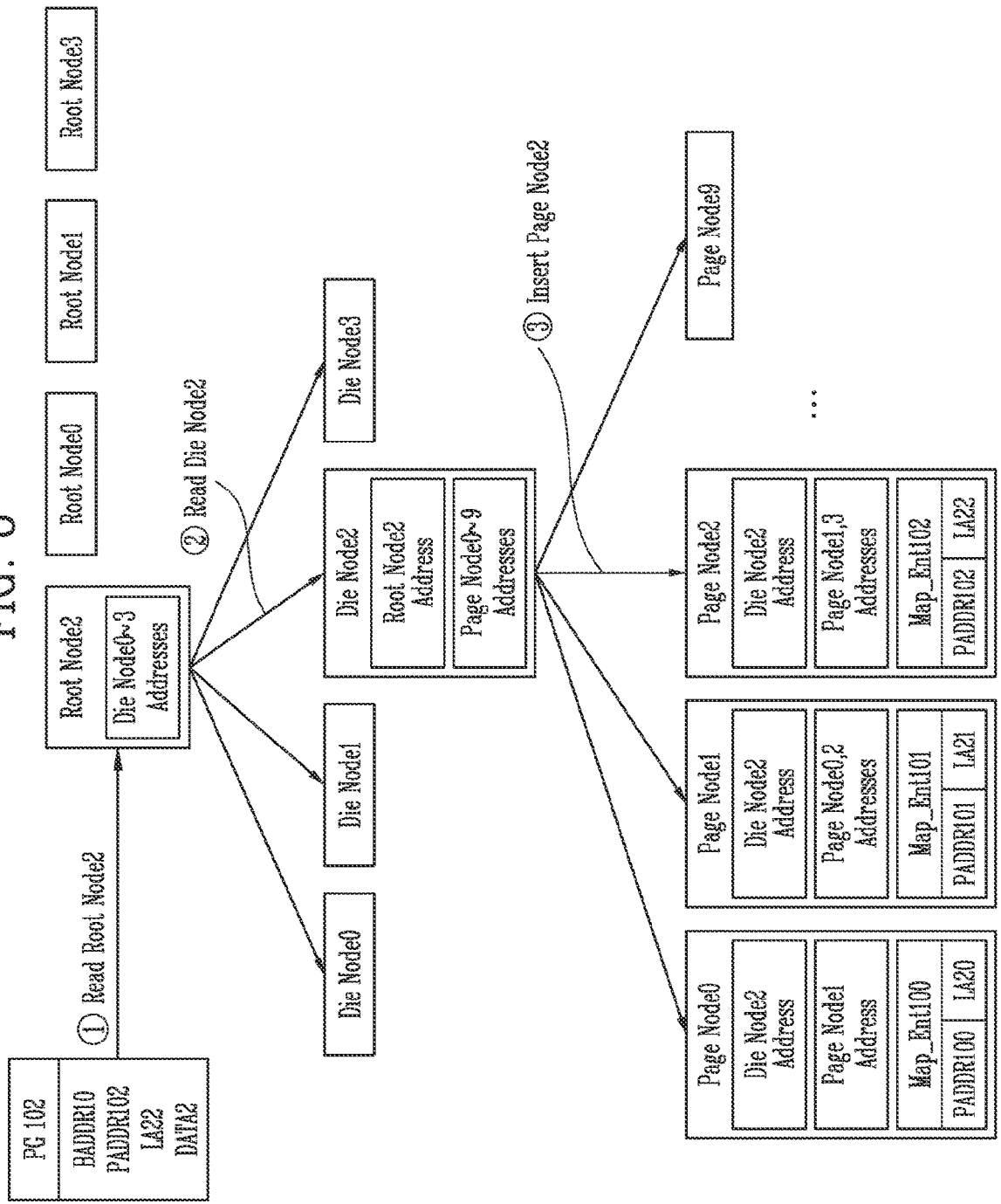
FIG. 8 is a diagram illustrating an operation of storing a logical address corresponding to an address of a page in the map data having the tree structure in accordance with an embodiment of the present disclosure.

FIG. 8 is a diagram illustrating an operation of storing a logical address corresponding to an address of a page in the map data having the tree structure in accordance with an embodiment of the present disclosure.

FIG. 8 will be described with reference to FIGS. 3 and 4. Referring to FIG. 8, the memory controller 200 may store the second data stored in the twenty-second page included in the second memory block in the hundred-and-second page included in the tenth memory block. The memory controller 200 may store, in the map area 112, a page node including map entry in which the twenty-second logical address LA22 mapped to the twenty-second page address is mapped to the hundred-and-second page address PADDR102.

The memory controller 200 may identify the second super block including the tenth memory block, based on a tenth block address BADDR10 of the tenth memory block including the hundred-and-second page PG102.

In an embodiment, when a super block is configured with memory blocks included in four memory dies, the memory controller 200 may identify, as the super block including the tenth memory block, a quotient according to a result obtained by dividing the block address of the tenth memory block by 4. Specifically, the block address of the tenth memory block is 10, and therefore, a quotient according to a result obtained by dividing 10 by 4 may be 2. Since the quotient is 2, the memory controller 200 may identify, as the second super block, the super block including the tenth memory block. The memory controller 200 may read a second root node Root Node2 corresponding to the second super block.

The second root node Root Node2 may include addresses of die nodes associated with the second root node. The die nodes associated with the second root node may be zeroth to third die nodes Die Node0 to 3. This will be described with reference to FIG. 2. The zeroth die node Die Node0 may be included in the second super block SPBLK2, and correspond to the eighth memory block BLK8 included in the fourth memory die 105. The first die node Die Node1 may be included in the second super block SPBLK2, and correspond to the ninth memory block BLK9 included in the fifth memory die 106. The second die node Die Node2 may be included in the second super block SPBLK2, and correspond to the tenth memory block BLK10 included in the sixth memory die 107. The third die node Die Node3 may be included in the second super block SPBLK2, and correspond to the eleventh memory block BLK11 included in the seventh memory die 108.

In an embodiment, the memory controller 200 may identify, as the memory die including the tenth memory block, a remainder according to a result obtained by dividing the block address of the tenth memory block by 4. Specifically, the block address of the tenth memory block is 10, and therefore, a remainder according to a result obtained by dividing 10 by 4 may be 2. In an embodiment, this will be described with reference to FIG. 2. When the remainder is 0, the memory die may correspond to the fourth memory die 105. When the remainder is 1, the memory die may correspond to the fifth memory die 106. When the remainder is 2, the memory die may correspond to the sixth memory die 107. When the remainder is 3, the memory die may correspond to the seventh memory die 108.

Since the remainder is 2, the memory controller 200 may identify that the memory die including the tenth memory block is the sixth memory die 107. The memory controller 200 may read a second die node Die Node2 corresponding to the sixth memory die 107 among the die nodes associated with the second root node.

The second die node Die Node2 may include address page nodes associated with the second die node. In an embodiment, the page nodes associated with the second die node may be zeroth to ninth page nodes Page Node0 to 9. The memory controller 200 may read the zeroth to ninth page nodes Page Node to 9, based on addresses Page Node0 to 9 addresses of the zeroth to ninth page nodes. In an embodiment, the zeroth page node Page Node0 may correspond to the hundredth page included in the tenth memory block. The first page node Page Node1 may correspond to the hundred-and-first page included in the tenth memory block. The second page node Page Node2 may correspond to the hundred-and-second page included in the tenth memory block.

In an embodiment, the memory controller 200 may identify a second page node Page Node2 corresponding to the hundred-and-second page included in the tenth memory block, based on the addresses Page Node0 to 9 Addresses of the zeroth to ninth page nodes and the address of the hundred-and-second page included in the tenth memory block. Specifically, when the address Page Node2 address of the second page node is not included in the second die node Die Node2 or when the second page node corresponding to the hundred-and-second page is not read, the memory controller 200 may store, in the map area 112, the second page node Page Node2 including the hundred-and-second entry Map_Ent102 in which the hundred-and-second page address PADDR102 and the twenty-second logical address LA22 are mapped to each other. The second page node may include an address Die Node2 Address of the second die node. The second page node Page Node2 may include an address Page Node1 Address of the first page node including the hundred-and-first page address PADDR101 as a page address successive to the hundred-and-second page address PADDR102 and an address Page Node3 Address of the third page node including a hundred-and-third address as a page address successive to the hundred-and-second page address PADDR102.

In an embodiment, when a second page node corresponding to the hundred-and-second page is read, the memory controller 200 may set invalid information representing that the read second page node is an invalid node, and store the invalid information in the map area 112, and then store, in the map area 112, the second page node Page Node2 including the hundred-and-second entry Map_Ent102 as a new second page node. The memory controller 200 stores the second page node Page Node2 including the hundred-and-second entry Map_Ent102 and then adds the address Page Node2 Address of the second page to the second die node Die Node2.

In an embodiment, the memory controller 200 may read a root node and a die node, based on a block address of a memory block among a plurality of memory blocks. The memory controller 200 may store, in the map area 112, a page node including a map entry in which a page address and a logical address are mapped to each other.

Figure 9:
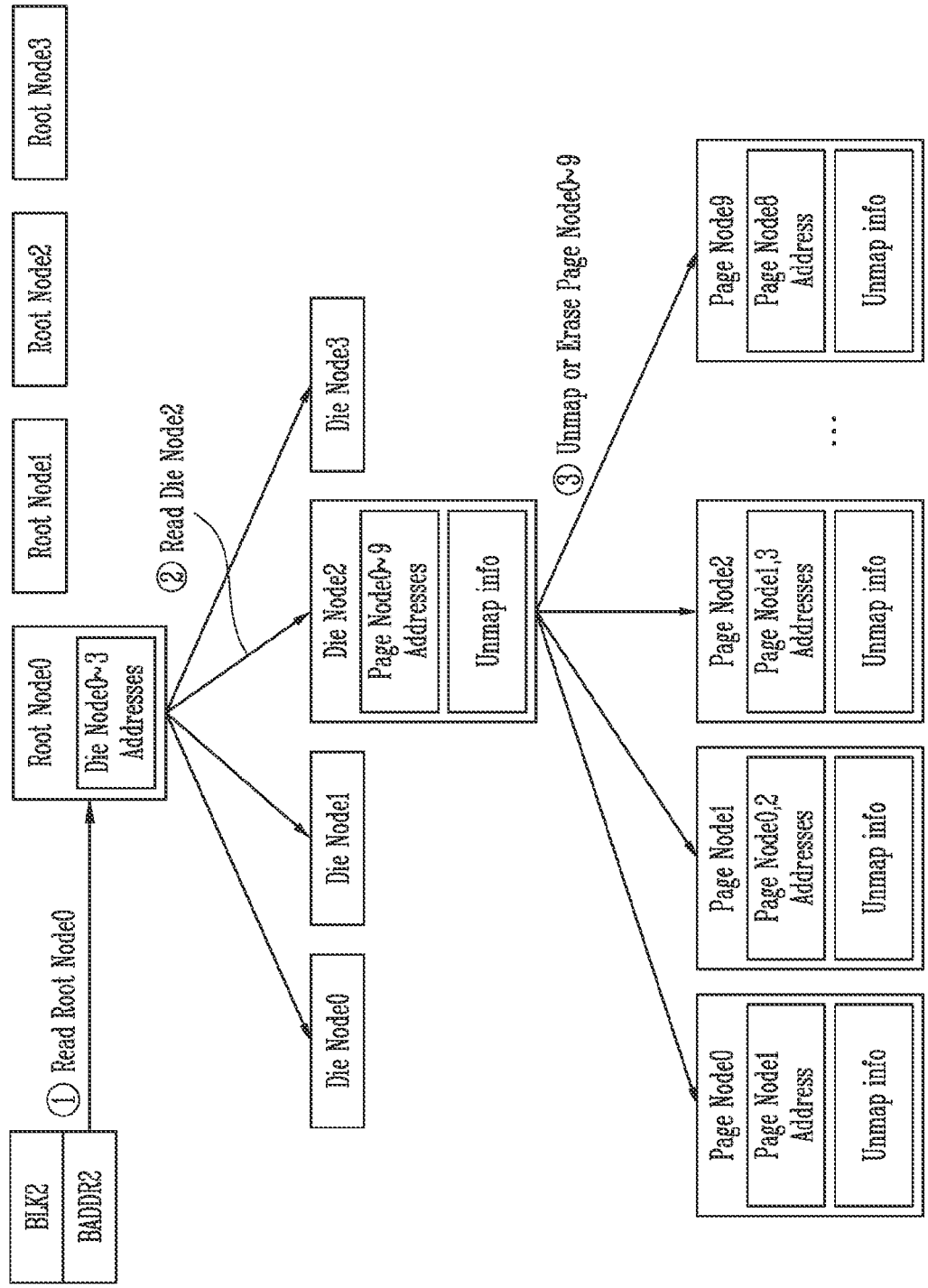
FIG. 9 is a diagram illustrating an operation of erasing a die node and page nodes or setting unmap information in the map data having the tree structure in accordance with an embodiment of the present disclosure.

FIG. 9 is a diagram illustrating an operation of erasing a die node and page nodes or setting unmap information in the map data having the tree structure in accordance with an embodiment of the present disclosure.

Referring to FIGS. 3 and 9, after data stored in the second memory block BLK2 is moved to the tenth memory block BLK10 and then stored in the tenth memory block BLK10, the data stored in the second memory block BLK2 may be erased. In addition, map data associated with the second memory block BLK2 may also be erased, or unmap information may be set.

In FIG. 9, in the map data including the tree structure, a case where map data associated with the second memory block BLK2 is erased or a case where unmap information is set will be described as an example. The memory controller 200 may identify a root node and a die node, based on the second block address BADDR2 as the block address of the second memory block.

A quotient according to a result obtained by dividing 2 as the block address of the second memory block by 4 is 0, and therefore, the memory controller 200 may read a zeroth root node Root Node0 corresponding to the zeroth super block including the second memory block. A remainder according to the result obtained by dividing 2 as the block address of the second memory block by 4 is 2, and therefore, the memory controller 200 may read a second die node Die Node2 corresponding to the second memory die including the second memory block.

In an embodiment, the memory controller 200 may set, in the second die node Die Node2, unmap information Unmap info representing that the second die node Die Node2 is not connected to the zeroth root node. When the second die node Die Node2 is read after the unmap information Unmap info is set in the second die node Die Node2, the memory controller 200 may identify that the second die node Die Node2 is not any valid map data.

In an embodiment, the memory controller 200 may read zeroth to ninth page nodes Page Node0 to 9 included in the second die node, based on addresses Page Node0 to 9 Addresses of the zeroth to ninth page nodes. The memory controller 200 may set unmap information in each of the zeroth to ninth page nodes. In an embodiment, the memory controller 200 may read the zeroth to ninth page nodes Page Node0 to 9 according to a predetermined order, thereby setting unmap information Unmap info. For example, the memory controller 200 may sequentially read the zeroth to ninth page nodes Page Node0 to 9, thereby setting the unmap information. In another example, the memory controller 200 may read the zeroth to ninth page nodes Page Node0 to 9 according to an order in which the addresses Page Node0 to 9 Addresses of the zeroth to ninth page nodes become small or large, thereby setting the unmap information.

In an embodiment, the memory controller 200 may erase the second die node Die Node2 and the zeroth to ninth page nodes Page Node0 to 9. When the second die node Die Node2 is erased, the memory controller 200 may remove the address Die Node2 Address of the second die node included in the zeroth root node Root Node0.

Figure 10:
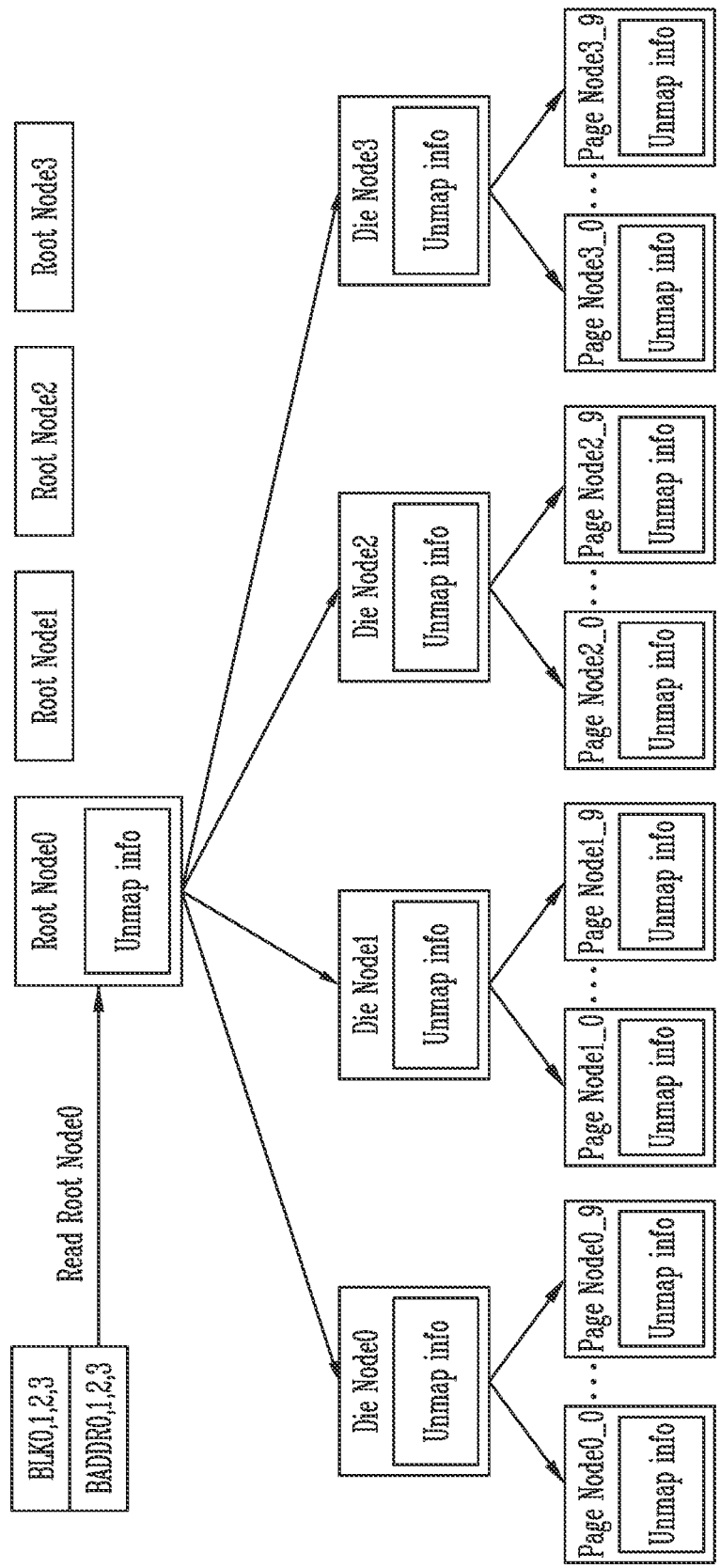
FIG. 10 is a diagram illustrating an order in which unmap information is set in die nodes and page nodes in accordance with an embodiment of the present disclosure.

FIG. 10 is a diagram illustrating an order in which unmap information is set in die nodes and page nodes in accordance with an embodiment of the present disclosure.

Referring to FIGS. 2 and 10, the memory controller 200 may move data stored in the zeroth super block SPBLK0 to the second super block SPBLK2, store the data in the second super block SPBLK2, and then erase data stored in the zeroth memory block BLK0, the first memory block BLK1, the second memory block BLK2, and the third memory block BLK3, which are included in the zeroth super block SPBLK0. Also, the memory controller 200 may set unmap information in map data associated with the zeroth super block SPBLK0.

In an embodiment, the memory controller 200 may read a zeroth root node Root Node0, based on zeroth to third block addresses BADDR0 to 3 as block addresses of the zeroth to third memory blocks BLK0 to BLK3. Die nodes associated with the zeroth root node may be zeroth to third die nodes Die Node0 to 3. The zeroth to third die nodes Die Node0 to 3 may respectively correspond to the zeroth to third memory blocks BLK0 to BLK3. Page nodes associated with the zeroth die node may be (0_0)th to (0_9)th page nodes Page Node0_0 to 0_9. Each of the (0_0)th to (0_9)th page nodes Page Node0_0 to 0_9 may correspond to zeroth to ninth pages of the zeroth memory block.

The memory controller 200 may set unmap information Unmap info in each of a root node, die nodes, and page nodes according to a predetermined order. In an embodiment, the memory controller 200 may set the unmap information Unmap info in each of the root node, the die nodes, and the page nodes according to a pre-order method. The pre-order method may be a method of setting unmap information in the root node and then setting unmap information from a left node to a right node. For example, according to the pre-order method, the memory controller 200 may set unmap information Unmap info in the zeroth root node Root Node0, set unmap information Unmap info in each of the zeroth die node Die Node0 and the (0_0)th to (0_9)th page nodes Page Node0_0 to 0_9, set unmap information Unmap info in each of the first die node Die Node1 and (1_0)th to (1_9)th page nodes Page Node1_0 to 1_9, set unmap information Unmap info in each of the second die node Die Node2 and (2_0)th to (2_9)th page nodes Page Node2_0 to 2_9, and set unmap information Unmap info in each of the third die node Die Node3 and (3_0)th to (3_9)th page nodes Page Node3_0 to 3_9.

In another embodiment, the memory controller 200 may set the unmap information Unmap info in each of the root node, the die nodes, and the page nodes according to an in-order method. The in-order method may be a method of setting unmap information in a left node, setting unmap information in the root node, and setting unmap information in a right node. For example, according to the in-order method, the memory controller 200 may set unmap information Unmap info in each of the zeroth die node Die Node0 and the (0_0)th to (0_9)th page nodes Page Node0_0 to 0_9, set unmap information Unmap info in each of the first die node Die Node1 and (1_0)th to (1_9)th page nodes Page Node1_0 to 1_9, set unmap information Unmap info in the zeroth root node Root Node0, set unmap information Unmap info in each of the second die node Die Node2 and (2_0)th to (2_9)th page nodes Page Node2_0 to 2_9, and set unmap information Unmap info in each of the third die node Die Node3 and (3_0)th to (3_9)th page nodes Page Node3_0 to 3_9.

In another embodiment, the memory controller 200 may set the unmap information Unmap info in each of the root node, the die nodes, and the page nodes according to a post-order method. The post-order method may be a method of setting unmap information in a left node, setting unmap information in a right node, and setting unmap information in the root node. For example, according to the post-order method, the memory controller 200 may set unmap information Unmap info in each of the zeroth die node Die Node0 and the (0_0)th to (0_9)th page nodes Page Node0_0 to 0_9, set unmap information Unmap info in each of the first die node Die Node1 and (1_0)th to (1_9)th page nodes Page Node1_0 to 1_9, set unmap information Unmap info in each of the second die node Die Node2 and (2_0)th to (2_9)th page nodes Page Node2_0 to 2_9, set unmap information Unmap info in each of the third die node Die Node3 and (3_0)th to (3_9)th page nodes Page Node3_0 to 3_9, and set unmap information Unmap info in the zeroth root node Root Node0.

Figure 11:
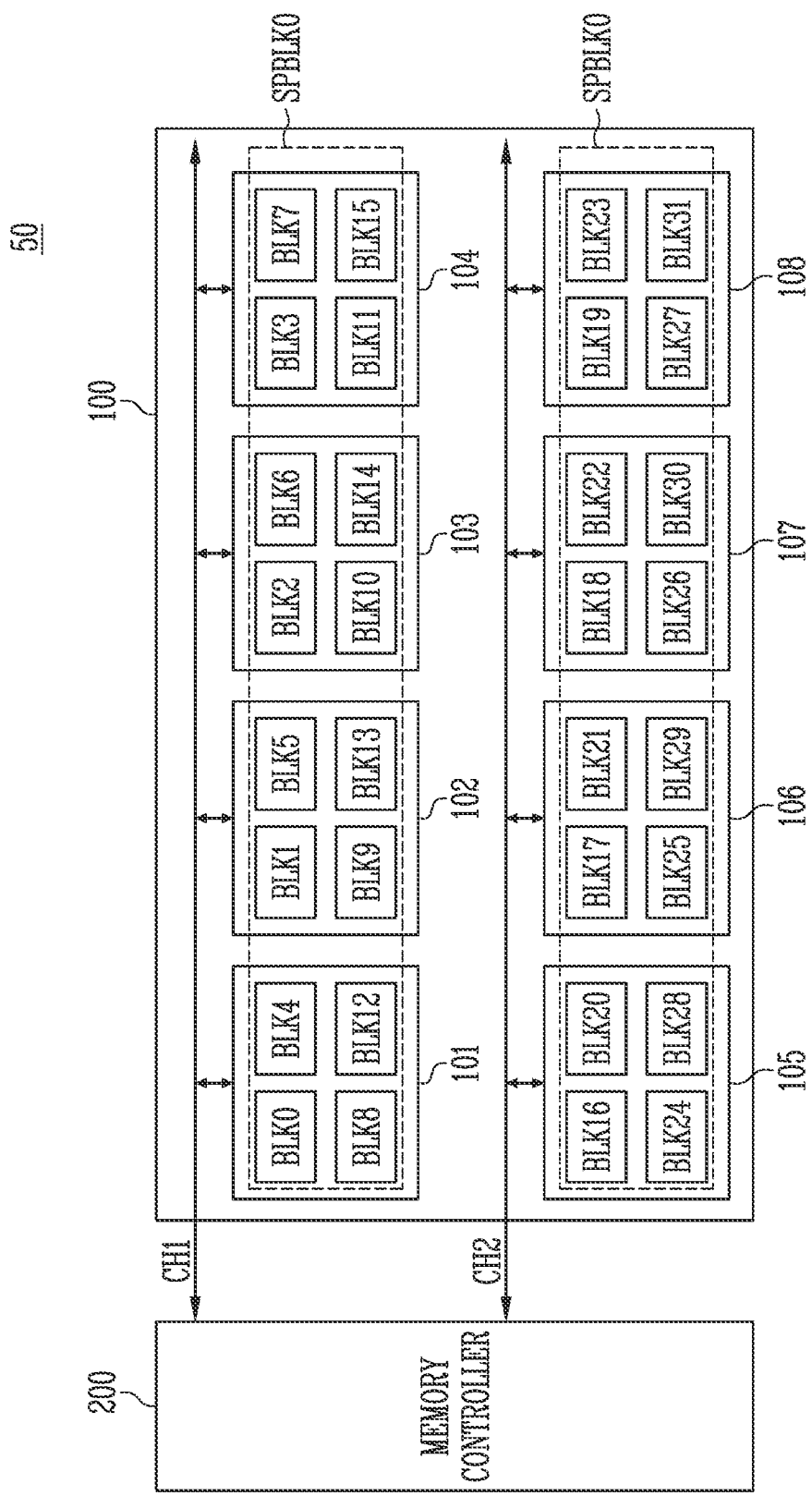
FIG. 11 is a diagram illustrating super blocks in accordance with another embodiment of the present disclosure.

FIG. 11 is a diagram illustrating super blocks in accordance with another embodiment of the present disclosure.

Referring to FIG. 11, the memory controller 200 may organize, as a super block, at least two memory blocks included in different memory dies. In an embodiment, a zeroth super block SPBLK0 may be configured with four memory blocks included in each of zeroth to third memory dies 101 to 104. For example, the memory controller 200 may organize, the zeroth super block SPBLK0, a zeroth memory block BLK0, a fourth memory block BLK4, an eighth memory block BLK3, and a twelfth memory block BLK12, which are included in the zeroth memory die 101, a first memory block BLK1, a fifth memory block BLK5, a ninth memory block BLK9, and a thirteenth memory block BLK13, which are included in the first memory die 102, a second memory block BLK2, a sixth memory block BLK6, a tenth memory block BLK10, and a fourteenth memory block BLK14, which are included in the second memory die 103, and a third memory block BLK3, a seventh memory block BLK7, an eleventh memory block BLK11, and a fifteenth memory block BLK15, which are included in the third memory die 104.

In an embodiment, memory blocks included in one memory die may be included in different planes. For example, the zeroth memory block BLK0 may be included in a zeroth plane of the zeroth memory die 101, the fourth memory block BLK4 may be included in a first plane of the zeroth memory die 101, the eighth memory block BLK8 may be included in a second plane of the zeroth memory die 101, and the twelfth memory block BLK12 may be included in a third plane of the zeroth memory die 101. In another example, the zeroth memory block BLK0, the fourth memory block BLK4, the eighth memory block BLK8, and the twelfth memory block BLK12 may be included in the same plane.

In an embodiment, the memory controller 200 may organize, as a first super block SPBLK1, four memory blocks included in each of fourth to seventh memory dies 105 to 108.

Figure 12:
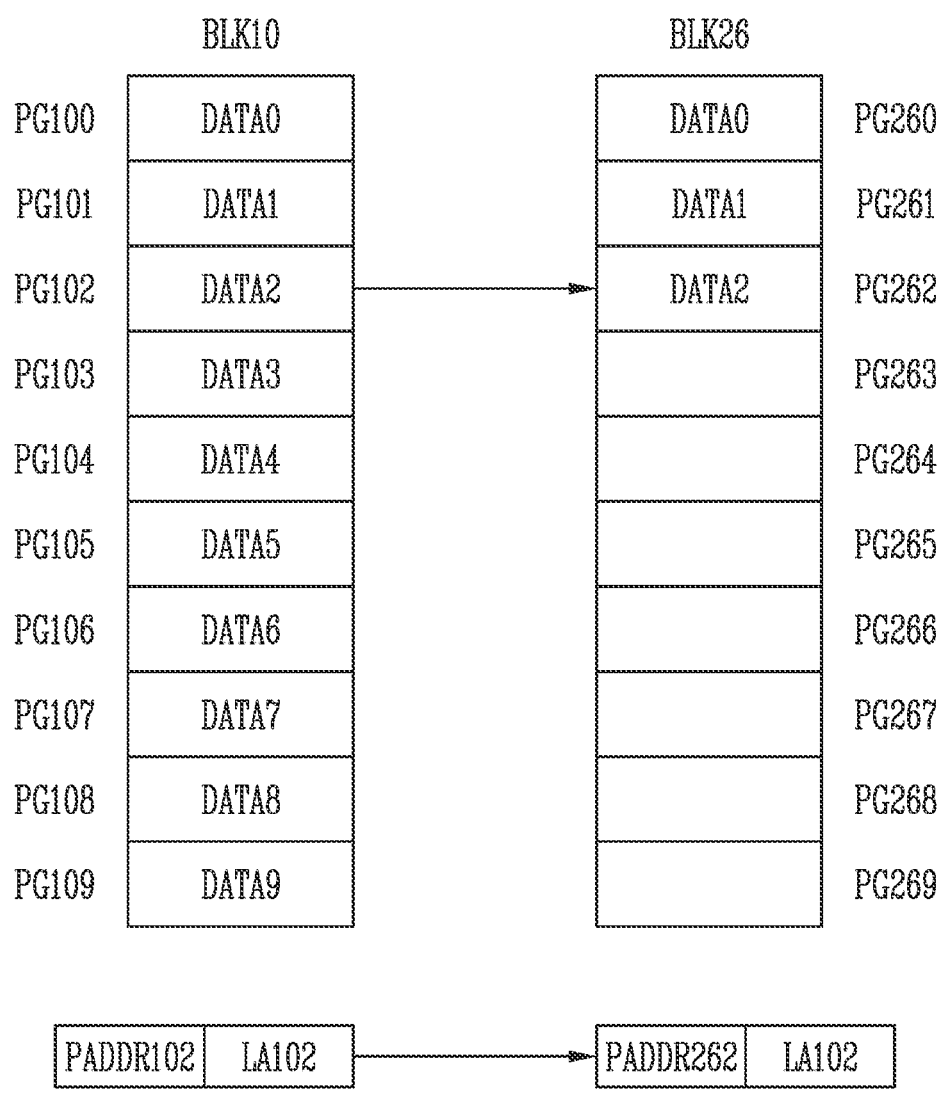
FIG. 12 is a diagram illustrating a data movement operation according to the super blocks of FIG. 11 in accordance with an embodiment of the present disclosure.

FIG. 12 is a diagram illustrating a data movement operation according to the super blocks of FIG. 11 in accordance with an embodiment of the present disclosure.

Referring to FIG. 12, the memory system 50 may perform a data movement operation of copying data from the tenth memory block BLK10 included in the zeroth super block to a twenty-sixth memory block BLK26 included in the first super block. The tenth memory block BLK10 may include hundredth to hundred-and-ninth pages PG100 to PG109. The twenty-sixth memory block BLK26 may include two-hundred-and-sixtieth to two-hundred-and-sixty-ninth pages PG260 to PG269.

In an embodiment, the memory system 50 may copy zeroth and first data DATA0 and DATA1 from the hundredth and hundred-and-first pages PG100 and PG101 to the two-hundred-and-sixtieth and two-hundred-and-sixty-first pages PG260 and PG261. After that, the memory system 50 may copy second data DATA2 from the hundred-and-second page PG102 to the two-hundred-and-sixty-second page PG262.

In an embodiment, the memory system 50 may update map data according to the data movement operation. Since a position at which the second data DATA2 is stored has been changed, the memory system 50 may map, to a two-hundred-and-sixty-second page address PADDR262, a hundred-and-second logical address LA102 mapped to a hundred-and-second page address PADDR102.

Figure 13:
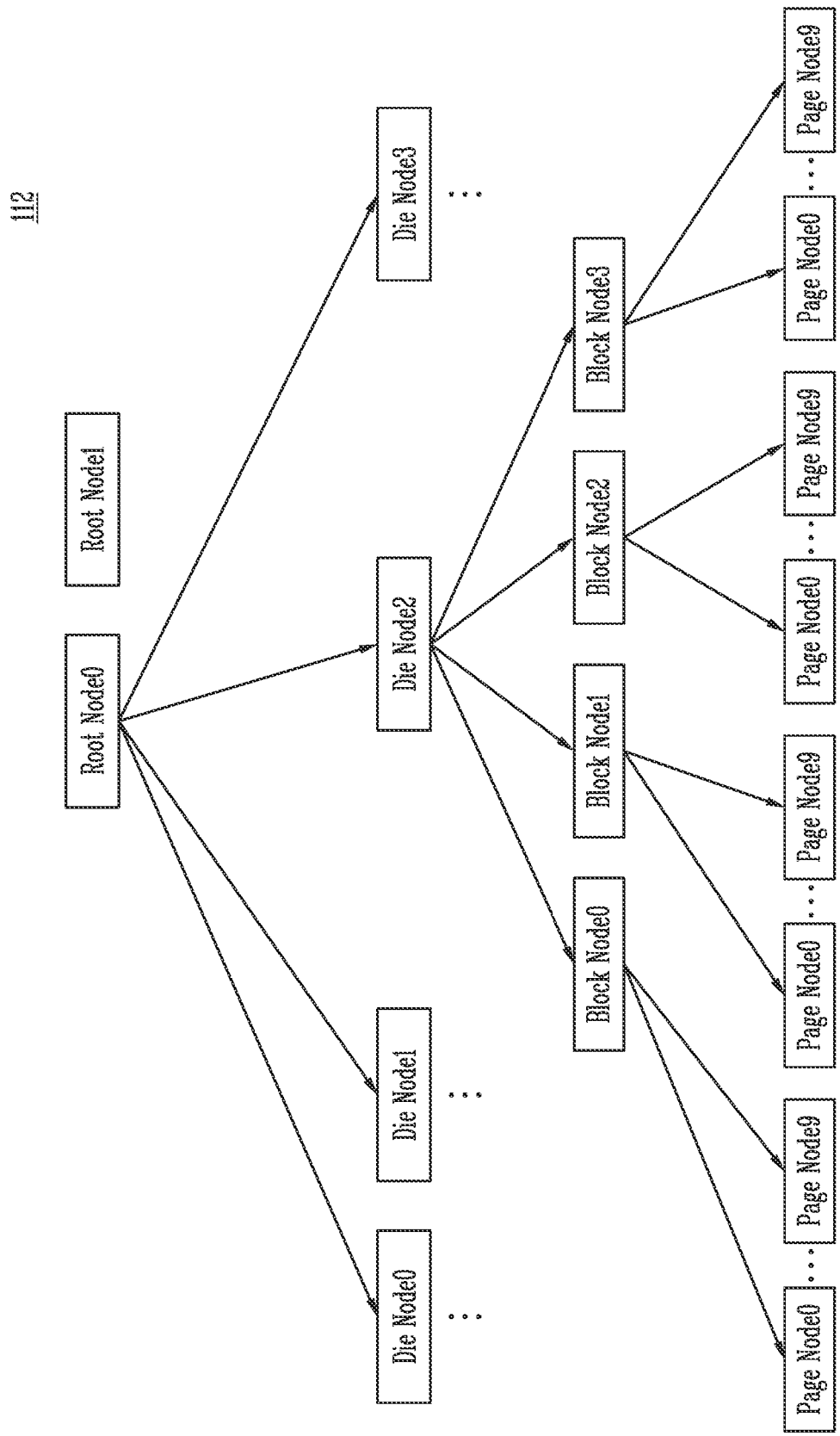
FIG. 13 is a diagram illustrating map data having a tree structure to which block nodes are added in accordance with an embodiment of the present disclosure.

FIG. 13 is a diagram illustrating map data having a tree structure to which block nodes are added in accordance with an embodiment of the present disclosure.

FIG. 13 will be described with reference to FIGS. 11 and 12. Referring to FIG. 13, the map data having the tree structure may further include block nodes. In an embodiment, the map data may include root nodes Root Node, die nodes Die Node, block nodes Block Node, and page nodes Page Node.

The root nodes may be nodes identifying respective super blocks each including a plurality of memory blocks. The die nodes may be nodes identifying respective memory dies each including a plurality of memory blocks. The block nodes may be nodes identifying respective memory blocks. The page nodes may be nodes identifying respective pages included in each of the memory blocks.

In an embodiment, the map data may include zeroth and first root nodes Root Node0 and Root Node1. The zeroth and first root nodes Root Node0 and Root Node1 may respectively correspond to the zeroth and first super blocks SPBLK0 and SPBLK1 shown in FIG. 11.

In an embodiment, zeroth to third die nodes Die Node0 to 3 may be nodes associated with the zeroth root node Root Node0. The zeroth to third die nodes Die Node0 to 3 may be included in the zeroth super block, and respectively correspond to a plurality of memory blocks included in the second memory die. Specifically, the zeroth to third die nodes Die Node0 to 3 may respectively correspond to the second memory block, the sixth memory block, the tenth memory block, and the fourteenth memory block.

In an embodiment, zeroth to ninth page nodes Page Node0 to 9 may be nodes associated with the zeroth to third die nodes Die Node0 to 3. The zeroth to ninth page nodes Page Node0 to 9 may be included in the zeroth super block, and respectively correspond to a plurality of pages included in the plurality of memory blocks included in the second memory die. In an embodiment, the zeroth to ninth page nodes Page Node0 to 9 associated with a second block node Block Node2 may respectively correspond to the hundredth to hundred-and-ninth pages PG100 to PG109 included in the tenth memory block BLK10 shown in FIGS. 11 and 12.

The memory controller 200 may read a map entry in which a page address and a logical address are mapped to each other, using the map data having the tree structure, to which the block nodes are added. An operation of reading a map entry, using the map data having the tree structure, to which the block nodes are added, will be described later with reference to FIG. 14.

Figure 14:
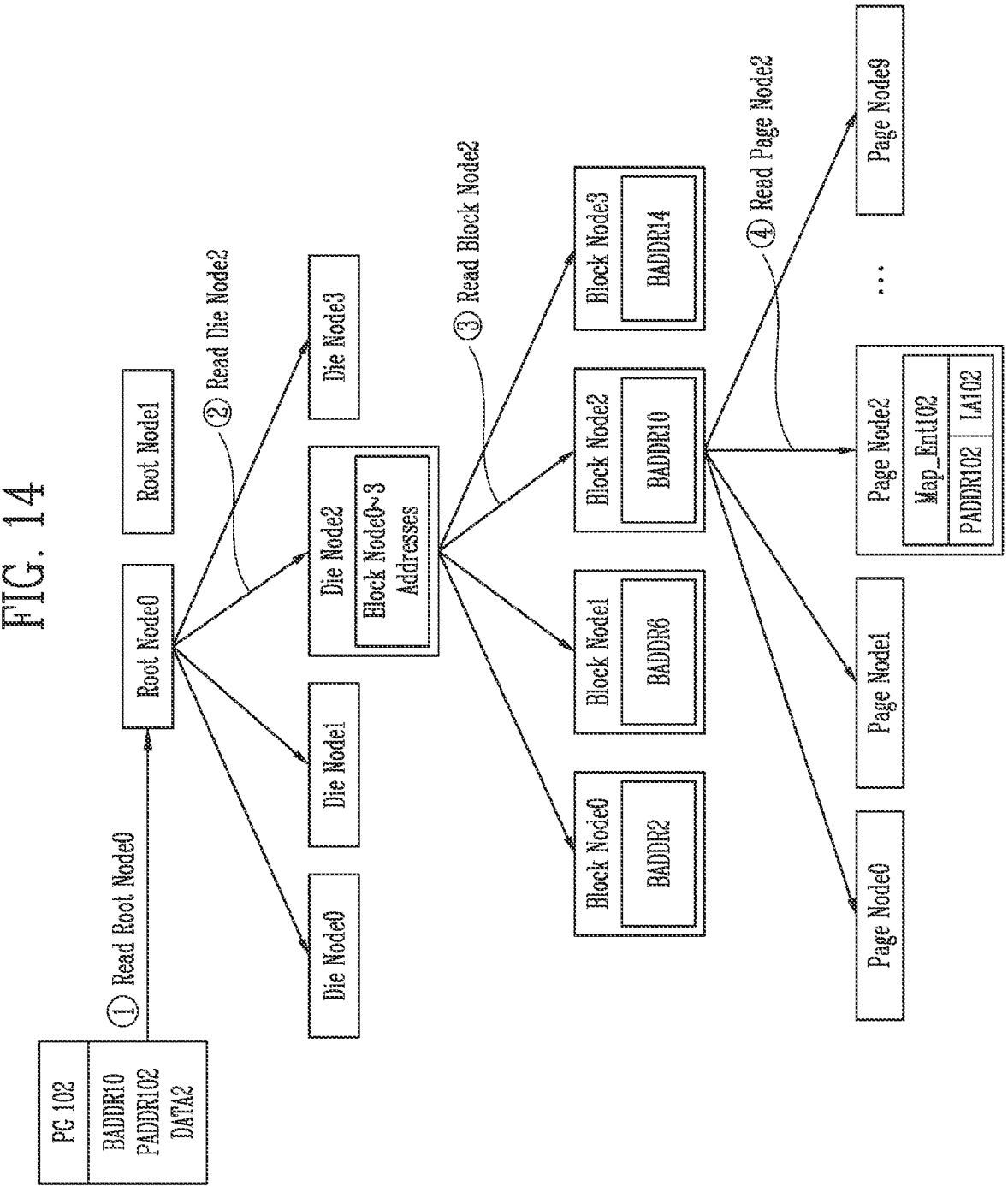
FIG. 14 is a diagram illustrating an operation of searching for a logical address corresponding to an address of a page in the map data having the tree structure, to which the block nodes are added in accordance with an embodiment of the present disclosure.

FIG. 14 is a diagram illustrating an operation of searching for a logical address corresponding to an address of a page in the map data having the tree structure, to which the block nodes are added in accordance with an embodiment of the present disclosure.

FIG. 14 will be described with reference to FIGS. 11 and 12. In FIG. 14, a case where the second data DATA2 stored in the hundred-and-second page PG102 included in the tenth memory block BLK10 is read and a hundred-and-second map entry including the hundred-and-second page address PADDR102 is read as shown in FIG. 12 will be described as an example.

Referring to FIG. 14, when a super block is configured with memory blocks included in four memory dies, the memory controller 200 may identify, as a super block including a memory block, a quotient according to a result obtained by dividing a block address of the memory block by 4. Specifically, when the quotient according to the result obtained by the block address of the memory block by 4 is 0 to 3, the memory controller 200 may identify that a super block including a memory block corresponding to the block address is the zeroth super block SPBLK0. When the quotient according to the result obtained by the block address of the memory block by 4 is 4 to 7, the memory controller 200 may identify that a super block including a memory block corresponding to the block address is the first super block SPBLK1.

In an embodiment, the memory controller 200 may identify, as the super block including the tenth memory block BLK10, a quotient according to a result obtained by dividing 10 as a block address of the tenth memory block BLK10 by 4. The quotient according to the result obtained by dividing 10 by 4 is 2, and therefore, the memory controller 200 may identify that the super block including the tenth memory block BLK10 is the zeroth super block SPBLK0. The memory controller 200 may read a zeroth root node Root Node0 corresponding to the zeroth super node SPBLK0.

In an embodiment, when a super block is configured with memory blocks included in four memory dies, the memory controller 200 may identify, as the memory die including the tenth memory block BLK10, a remainder according to a result obtained by dividing a block address of a memory block by 4. Specifically, a remainder according to a result obtained by dividing 10 as the block address of the tenth memory block BLK10 by 4 is 2, and therefore, the memory controller 200 may identify that a memory die including the tenth memory block BLK10 is the second memory die 103. The memory controller 200 may read a second die node Die Node2 corresponding to the second memory die 103, based on addresses of die nodes included in the zeroth root node Root Node0.

The second die node Die Node2 may include addresses of block nodes associated with the second die node. The addresses of the block nodes may be addresses representing positions at which the block nodes are stored. In an embodiment, the block nodes associated with the second die node may be zeroth to third block nodes Block Node0 to 3. The zeroth to third block nodes Block Node0 to 3 may be nodes identifying block addresses of memory blocks. This will be described with reference to FIG. 11. The zeroth block node Block Node0 may correspond to the second memory block BLK2, the first block node Block Node1 may correspond to the sixth memory block BLK6, the second block node Block Node2 may correspond to the tenth memory block BLK10, and the third block node Block Node3 may correspond to the fourteenth memory block BLK14. The zeroth block node Block Node0 may include a second block address BADDR2, the first block node Block Node1 may include a sixth block address BADDR6, the second block node Block Node2 may include a tenth block address BADDR10, and the third block node Block Node2 may include a fourteenth block address BADDR14.

In an embodiment, the memory controller 200 may read the second block node Block Node2 corresponding to the tenth memory block BLK10, based on the block address of the tenth memory block BLK10 and addresses Block Node0 to 3 Addresses of the zeroth to third block nodes included in the second die node Die Node2.

The memory controller 200 may read, based on the hundred-and-second page address PADDR102, a second page node Page Node2 corresponding to the hundred-and-second page address PADDR102 among zeroth to ninth page nodes Page Node0 to 9 associated with the second block node. The second page node Page Node2 may include a hundred-and-second map entry Map_Ent102 in which the hundred-and-second page address PADDR102 and the hundred-and-second logical address LA102 are mapped to each other. The memory controller 200 may acquire the hundred-and-second logical address LA102 corresponding to the hundred-and-second page address PADDR102 from the second page node Page Node2.

After that, the memory controller 200 may map the hundred-and-second logical address LA102 mapped to the hundred-and-second page address PADDR102 to the two-hundred-and-sixty-second page address PADDR262 to store the second data DATA2 stored in the hundred-and-second page PG102 included in the tenth memory block BLK10 in the two-hundred-and-sixty-second page PG262 included in the twenty-sixth memory block BLK26.

In an embodiment, the memory controller 200 may read, based on a block address of a memory block, a root node corresponding to a super block including the memory block among a plurality of memory blocks. The memory controller 200 may read, based on the block address of the memory block, a die node corresponding to a memory die including the memory block. The memory controller 200 may read, based on the block address of the memory block, a block node corresponding to the memory block. The memory controller 200 may read a page node corresponding to a page, in which data is stored among a plurality of pages included in the memory block an address of the page and addresses of page nodes included in the block node. The memory controller 200 may acquire, from the read page node, a map entry representing a logical address corresponding to the address of the page.

Figure 15:
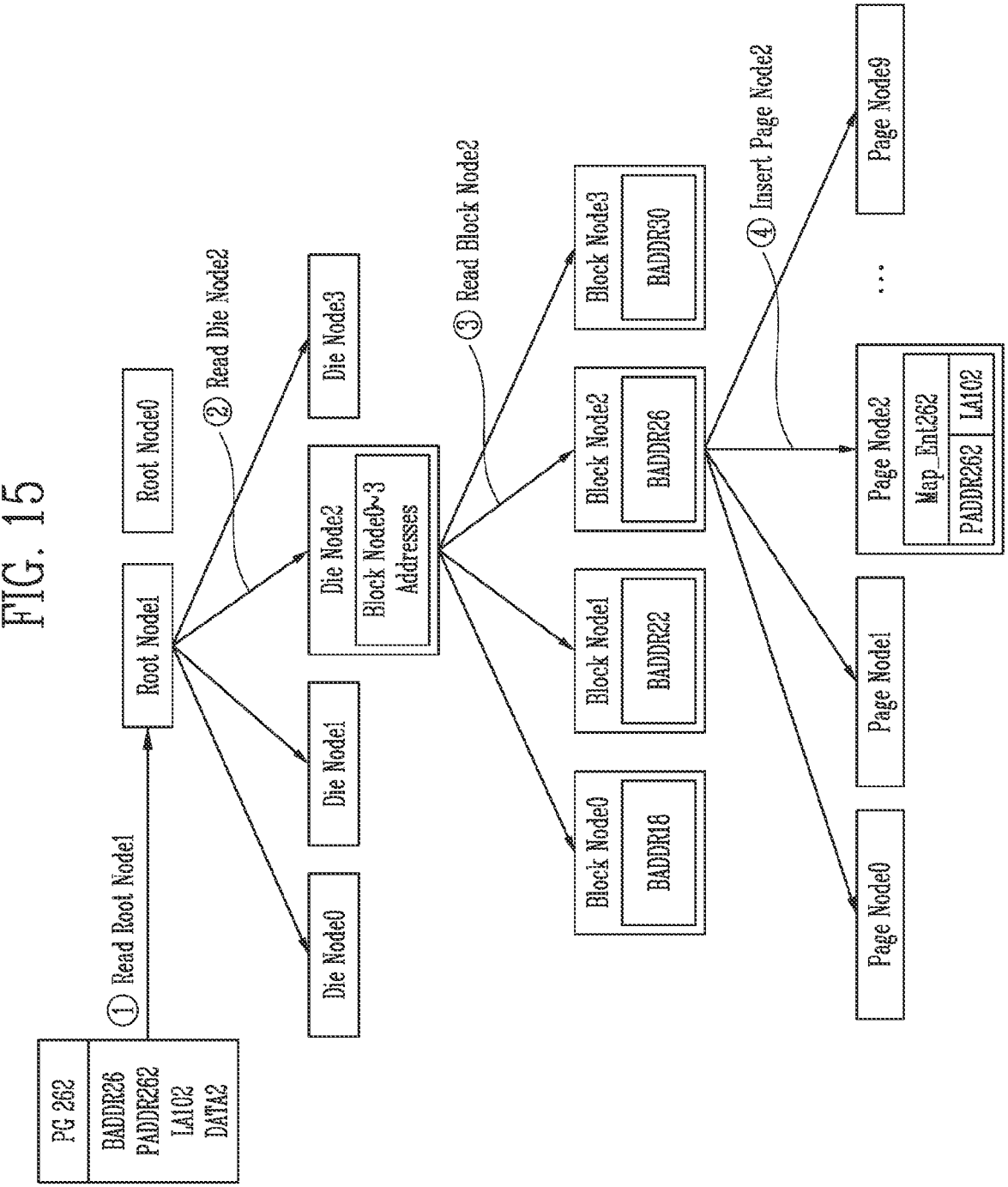
FIG. 15 is a diagram illustrating an operation of storing a logical address corresponding to an address of a page in the map data having the tree structure, to which the block nodes are added in accordance with an embodiment of the present disclosure.

FIG. 15 is a diagram illustrating an operation of storing a logical address corresponding to an address of a page in the map data having the tree structure, to which the block nodes are added in accordance with an embodiment of the present disclosure.

FIG. 15 will be described with reference to FIGS. 11 and 12. Referring to FIG. 15, the memory controller 200 may copy the second data DATA2 from the hundred-and-second page PG102 included in the tenth memory block BLK10 to the two-hundred-and-sixty-second page PG262 included in the twenty-sixth memory block BLK26. The memory controller 200 may store, in the map area 112, a page node including a map entry in which the hundred-and-second logical address LA102 mapped to the hundred-and-second page address PADDR102 is mapped to the two-hundred-and-sixty-second page address PADDR262.

The memory controller 200 may identify the first super block SPBLK1 including the twenty-sixth memory block BLK26, based on a twenty-sixth block address BADDR26 of the twenty-sixth memory block including the two-hundred-and-sixty-second page PG262.

In an embodiment, when a super block is configured with memory blocks included in four memory dies, the memory controller 200 may identify, as the super block including the twenty-sixth memory block BLK26, a quotient according to a result obtained by dividing a block address of the twenty-sixth memory block by 4. Specifically, the block address of the twenty-sixth memory block is 26, and therefore, the quotient according to a result obtained by dividing 26 by 4 may be 6. Since the quotient is 6 as a value between 4 and 7, the memory controller 200 may identify that the super block including the twenty-sixth memory block BLK26 is the first super block SPBLK1. The memory controller 200 may read a first root node Root Node1 corresponding to the first super block SPBLK1.

In an embodiment, when a super block is configured with memory blocks included in four memory dies, the memory controller 200 may identify, as the memory die including the twenty-sixth memory block BLK26, a remainder according to the result obtained by dividing the block address of the twenty-sixth memory block by 4. In an embodiment, this will be described with reference to FIG. 11. When the remainder according to the result obtained by dividing the block address of the twenty-sixth memory block by 4 is 0, the memory die may correspond to the fourth memory die 105. When the remainder according to the result obtained by dividing the block address of the twenty-sixth memory block by 4 is 1, the memory die may correspond to the fifth memory die 106. When the remainder according to the result obtained by dividing the block address of the twenty-sixth memory block by 4 is 2, the memory die may correspond to the sixth memory die 107. When the remainder according to the result obtained by dividing the block address of the twenty-sixth memory block by 4 is 3, the memory die may correspond to the seventh memory die 108.

In an embodiment, since the block address of the twenty-sixth memory block is 26, the remainder according to the result obtained by dividing 26 by 4 may be 2. The memory controller 200 may identify that the memory die including the twenty-sixth memory block BLK26 is the sixth memory die 107. The memory controller 200 may read a second die node Die Node2 corresponding to the sixth memory die 107 among die nodes associated with the first root node.

The second die node Die Node2 may include addresses of block nodes associated with the second die node. In an embodiment, the block nodes associated with the second die node may be zeroth to third block nodes Block Node0 to 3. The zeroth block node Block Node0 may include an eighteenth block address BADDR18, the first block node Block Node1 may include a twenty-second block address BADDR22, the second block node Block Node2 may include a twenty-sixth block address BADDR26, and the third block node Block Node3 may include a thirtieth block address BADDR30.

The memory controller 200 may read a second block node Block Node2 including the twenty-sixth block address BADDR26 of the twenty-sixth memory block, based on the twenty-sixth block address BADDR26 of the twenty-sixth memory block and addresses Block Node0 to 3 Addresses of the zeroth to third block nodes included in the second die node Die Node2.

The memory controller 200 may store, in the map area 112, a second page node Page Node2 including a two-hundred-and-sixty-second entry Map_Ent262 in which the two-hundred-and-sixty-second page address PADDR262 and the hundred-and-second logical address LA102 are mapped to each other. The memory controller 200 may identify the second page node Page Node2 based on the two-hundred-and-sixty-second page address PADDR262. In an embodiment, the memory controller 200 may add an address of the second page node Page Node2 to the second block node Block Node2.

In an embodiment, the memory controller 200 may read a root node, a die node, and a block node, based on a block address of a memory block among a plurality of memory blocks. The memory controller 200 may store, in the map area 112, a page node including a map entry in which a page address and a logical address are mapped to each other.

Figure 16:
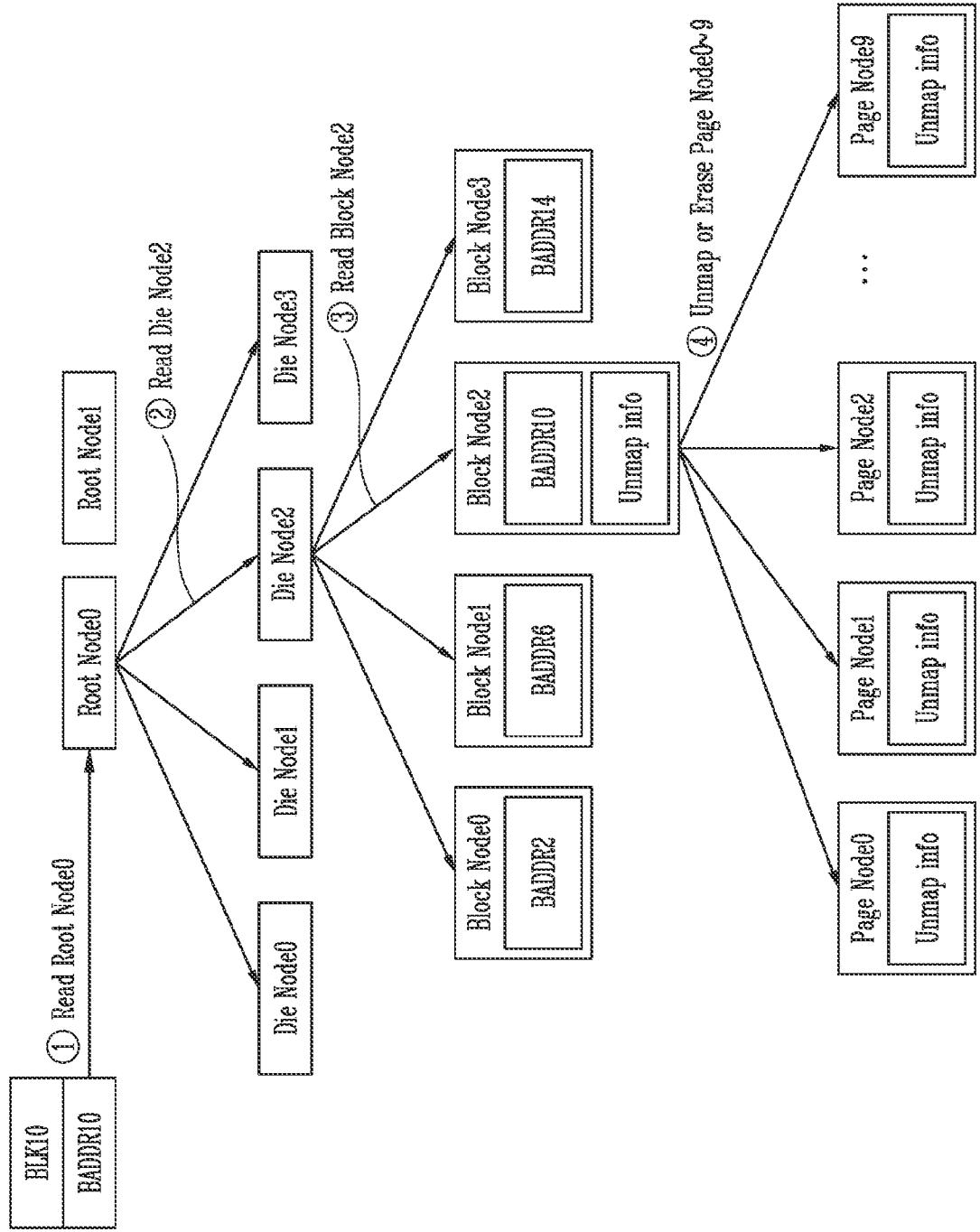
FIG. 16 is a diagram illustrating an operation of erasing a block node and a page node or setting unmap information in the map data having the tree structure, to which the block nodes are added in accordance with an embodiment of the present disclosure.

FIG. 16 is a diagram illustrating an operation of erasing a block node and a page node or setting unmap information in the map data having the tree structure, to which the block nodes are added in accordance with an embodiment of the present disclosure.

FIG. 16 will be described with reference to FIGS. 11 and 12. The memory controller 200 may move data stored in the tenth memory block BLK10 to the twenty-sixth memory block BLK26, store the data in the twenty-sixth memory block BLK26, and then ease the data stored in the tenth memory block BLK10. Also, the memory controller 200 may set or erase unmap information in map data associated with the tenth memory block BLK10.

In an embodiment, the memory controller 200 may identify a root node and a die node, based on the tenth block address BADDR10 of the tenth memory block. The memory controller 200 may read a zeroth root node Root Node0 corresponding to the zeroth super block SPBLK0 including the tenth memory block BLK10, and read a second die node Die Node2 corresponding to the second memory die 103 including the tenth memory block BLK10.

The memory controller 200 may read a second block node Block Node2 corresponding to the tenth memory block BLK10 among zeroth to third block nodes Block Node0 to 3 associated with the second die node. The memory controller 200 may set unmap information Unmap info in the second block node Block Node2. The memory controller 200 may read zeroth to ninth page nodes Page Node0 to 9 associated with the second block node, and set unmap information Unmap info in each of the zeroth to ninth page nodes Page Node0 to 9.

In an embodiment, the memory controller 200 may erase the second block node Block Node2 and the zeroth to ninth page nodes Page Node0 to 9. When the second block node Block Node2 is erased, the memory controller 200 may remove an address of the second block node included in the second die node Die Node2.

Figure 17:
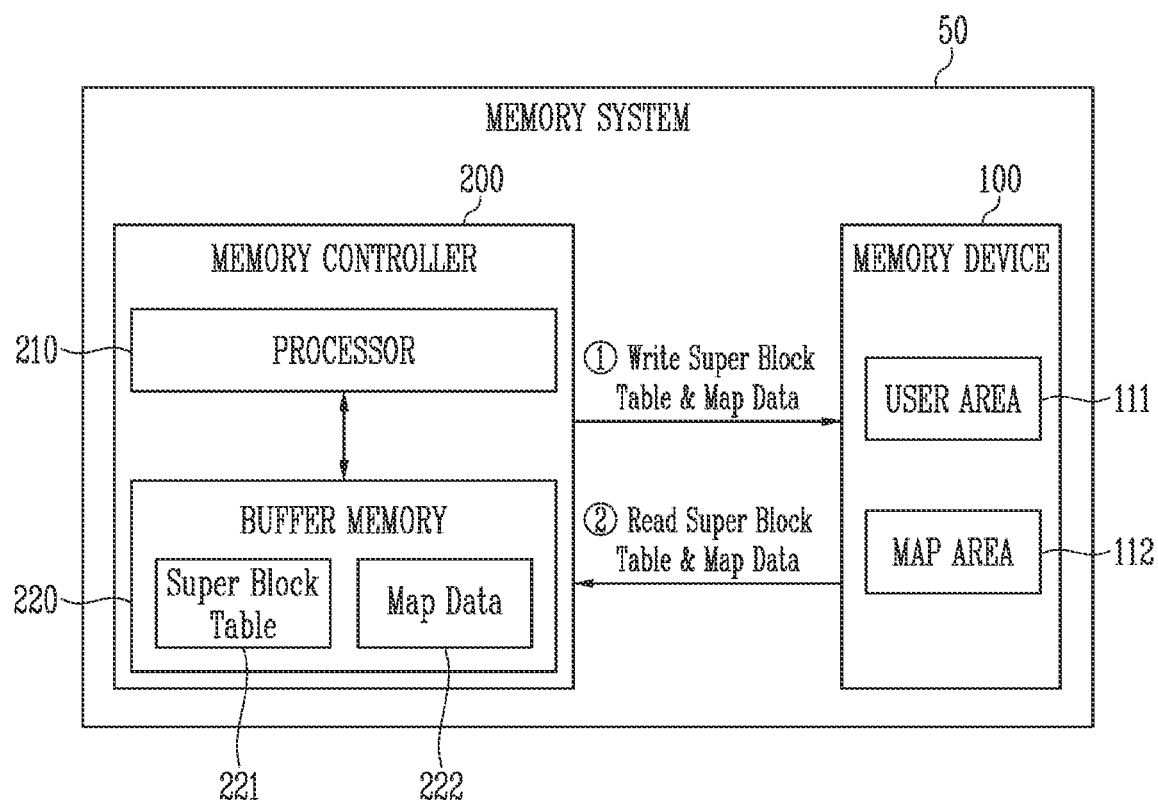
FIG. 17 is a diagram illustrating the memory system which stores a super block table and map data in the memory device in response to sudden power of in accordance with an embodiment of the present disclosure.

FIG. 17 is a diagram illustrating the memory system which stores a super block table and map data in the memory device in response to sudden power off in accordance with an embodiment of the present disclosure.

Referring to FIG. 17, the map area 112 may store a super block table and map data. The super block table and the map data, which are stored in the map area 112, may be read to the buffer memory 220. The map data 222 may be data having a tree structure. The map data 222 may include root nodes identifying super blocks including a plurality of memory blocks, die nodes identifying memory dies including a plurality of memory blocks, block nodes identifying block addresses of a plurality of memory blocks, and page nodes identifying addresses of a plurality of pages included in a plurality of memory blocks.

The processor 210 may control the memory device 100 to store, in the map area 112, the super block table 221 and the map data 221, which are stored in the buffer memory 220, in response to sudden power off. After that, the processor 210 may read the super block table to the buffer memory 220 during power-on. The processor 210 may read root nodes included in the super block, based on addresses of the root nodes. The processor 210 may sequentially read die nodes associated with the root nodes, block nodes associated with the die nodes, and page nodes associated with the block nodes. The processor 210 may perform a recovery operation of checking whether any lost data exists by sequentially reading the root nodes, the die nodes, the block nodes, and the page nodes in response to the power-on.

An embodiment will be described with reference to FIGS. 12 and 15. The processor 210 may perform a data movement operation of copying the second data DATA2 from the hundred-and-second page PG102 included in the tenth memory block BLK10 to the two-hundred-and-sixty-second page PG262 included in the twenty-sixth memory block BLK26, and map the hundred-and-second logical address LA102 mapped to the hundred-and-second page address PADDR102 to the two-hundred-and-sixty-second page address PADDR262. The processor 210 may temporarily store, in the buffer memory 220, a second page node Page Node2 including a map entry in which the two-hundred-and-sixty-second page address PADDR262 and the hundred-and-second logical address LA102 are mapped to each other.

After that, the processor 210 may transmit the second page node Page Node2 stored in the buffer memory 220 to the map area 112 in response to the sudden power off. Also, during the power-on, the processor 210 may perform a recovery operation of checking whether the map entry in which the two-hundred-and-sixty-second page address PADDR262 and the hundred-and-second logical address LA102 are mapped to each other is not lost but normally stored.

Specifically, the processor 210 may identify the first super block SPBLK1 including the twenty-sixth memory block BLK26, based on the twenty-sixth block address BADDR26 of the twenty-sixth memory block BLK26 including the two-hundred-and-sixty-second page PG262. The processor 210 may read a first root node Root Node1 corresponding to the first super block SPBLK1, based on addresses of root nodes included in the super block.

The processor 210 may identify the sixth memory die 107 including the twenty-sixth memory block BLK26, based on the twenty-sixth block address BADDR26 of the twenty-sixth memory block BLK26. The processor 210 may read a second die node Die Node2 corresponding to the sixth memory die 107, based on addresses of die nodes included in the first root node Root Node1.

The processor 210 may read zeroth to third block nodes Block Node0 to 3 associated with the second die node Die Node2, based on addresses of block nodes included in the second die node Die Node2. The processor 210 may identify, based on the twenty-sixth block address BADDR26 of the twenty-sixth memory block BLK26, a second block node Block Node2 corresponding to the twenty-sixth memory block BLK26 among the block nodes associated with the second die node Die Node2.

The processor 210 may read zeroth to ninth page nodes Page Node0 to 9 associated with the second block node Block Node2, based on addresses of page nodes included in the second block node Block Node2. The processor 210 may identify, based on the two-hundred-and-sixty-second page address PADDR262, a second page node Page Node2 corresponding to the two-hundred-and-sixty-second page PG262 among the zeroth to ninth page nodes Page Node0 to 9 associated with the second block node Block Node2. The processor 210 may acquire, from the second page node Page Node2, a map entry in which the two-hundred-and-sixty-second page address PADDR262 and the hundred-and-second logical address LA102 are mapped to each other. The processor 210 may identify, from the second page node Page Node2, whether the two-hundred-and-sixty-second page address PADDR262 and the hundred-and-second logical address LA102 are normally mapped to each other.

In an embodiment, the processor 210 may reduce a time required to check whether a map entry included in a page node is not lost but normally stored, using the map data having the tree structure in a recovery operation.

Figure 18:
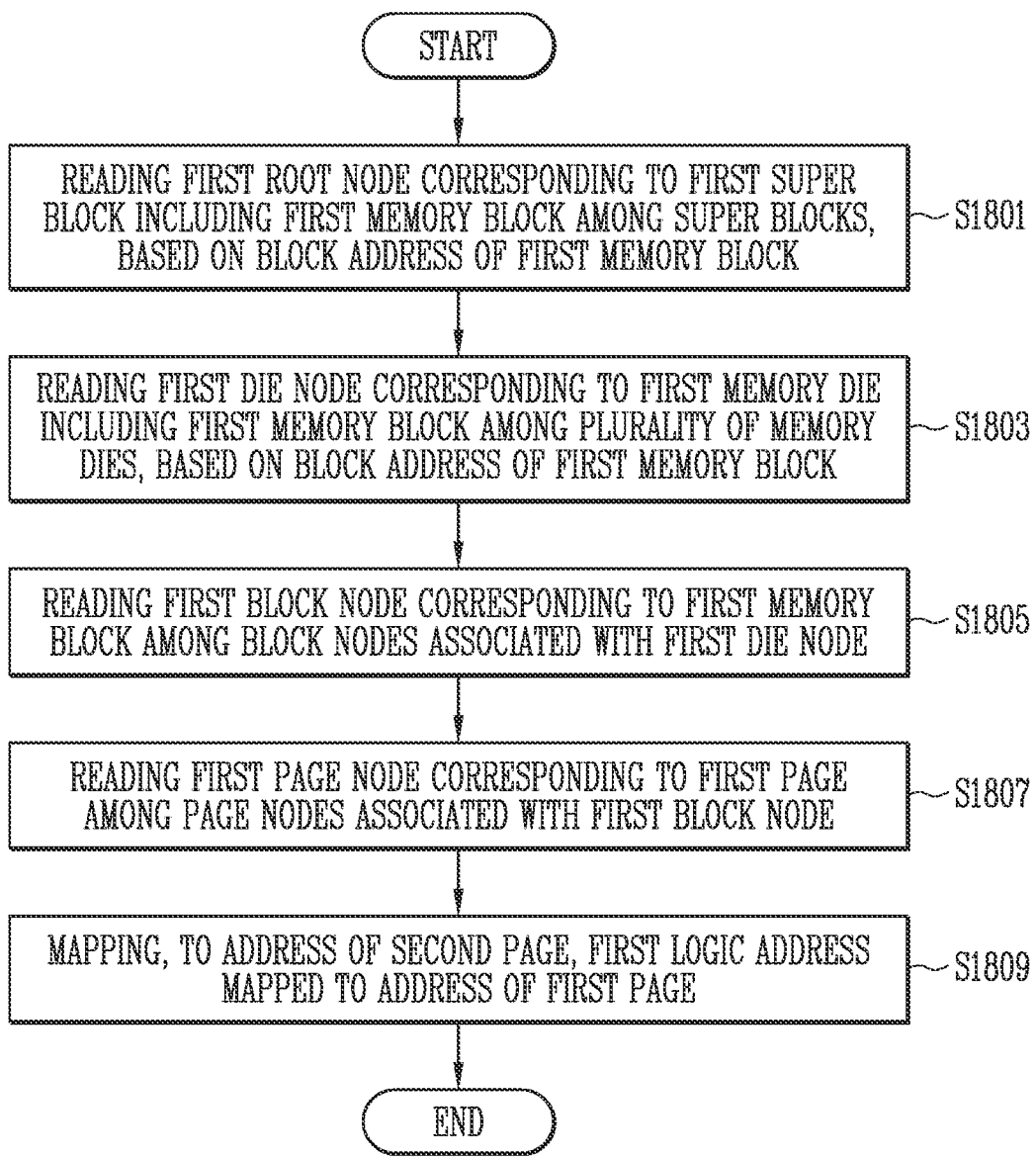
FIG. 18 is a flowchart illustrating an operation of searching for a logical address corresponding to an address of a page in the map data having the tree structure in accordance with an embodiment of the present disclosure.

FIG. 18 is a flowchart illustrating an operation of searching for a logical address corresponding to an address of a page in the map data having the tree structure in accordance with an embodiment of the present disclosure.

Referring to FIG. 18, in operation S1801, the memory system 50 may read a first root node corresponding to a first super block including a first memory block among super blocks, based on a block address of the first memory block.

In operation S1803, the memory system 50 may read a first die node corresponding to a first memory die including the first memory block among a plurality of memory dies, based on the block address of the first memory block.

In operation S1805, the memory system 50 may read, based on the block address of the first memory block, a first block node corresponding to the first memory block among block nodes associated with the first die node. The memory system 50 may read the first block node including the block address of the first memory block among the block nodes associated with the first die node.

In operation S1807, the memory system 50 may read a first page node corresponding to a first page among page nodes associated with the first block node, based on an address of the first page. The memory system 50 may read the first page node including the address of the first page in which data is stored among the page nodes associated with the first block node. The memory system 50 may acquire, from the first page node, a first logical address mapped to the address of the first page.

In operation S1809, the memory system 50 may map, to an address of a second page, the first logical address mapped to the address of the first page. The data stored in the first page may be copied to the second page.

Figure 19:
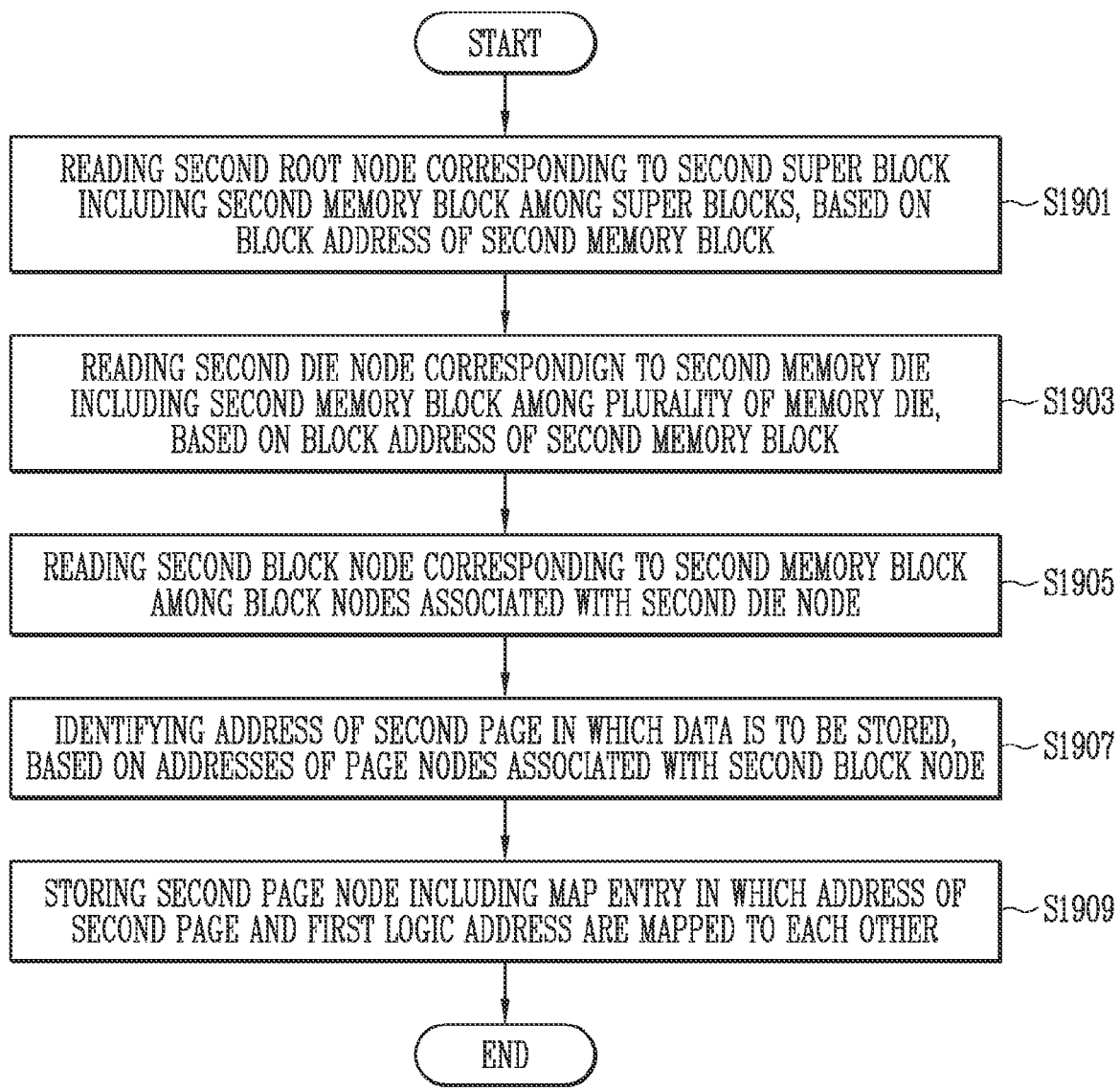
FIG. 19 is a flowchart illustrating an operation of storing a logical address corresponding to an address of a page in the map data having the tree structure in accordance with an embodiment of the present disclosure.

FIG. 19 is a flowchart illustrating an operation of storing a logical address corresponding to an address of a page in the map data having the tree structure in accordance with an embodiment of the present disclosure.

Referring to FIG. 19, in operation S1901, the memory system 50 may read a second root node corresponding to a second super block including a second memory block among super blocks, based on a block address of the second memory block.

In operation S1903, the memory system 50 may read a second die node corresponding to a second memory die including the second memory block among a plurality of memory dies, based on the block address of the second memory block.

In operation S1905, the memory system 50 may read, based on the block address of the second memory block, a second block node corresponding to the second memory block among block nodes associated with the second die node. The memory system 50 may read the second block node including the block address of the second memory block among the block nodes associated with the second die node.

In operation S1907, the memory system 50 may identify an address of a second page in which data is to be stored, based on addresses of page nodes associated with the second block node and the address of the second page.

In operation S1909, the memory system 50 may store a second page node including a map entry in which the address of the second page and a first logical address are mapped to each other.

Figure 20:
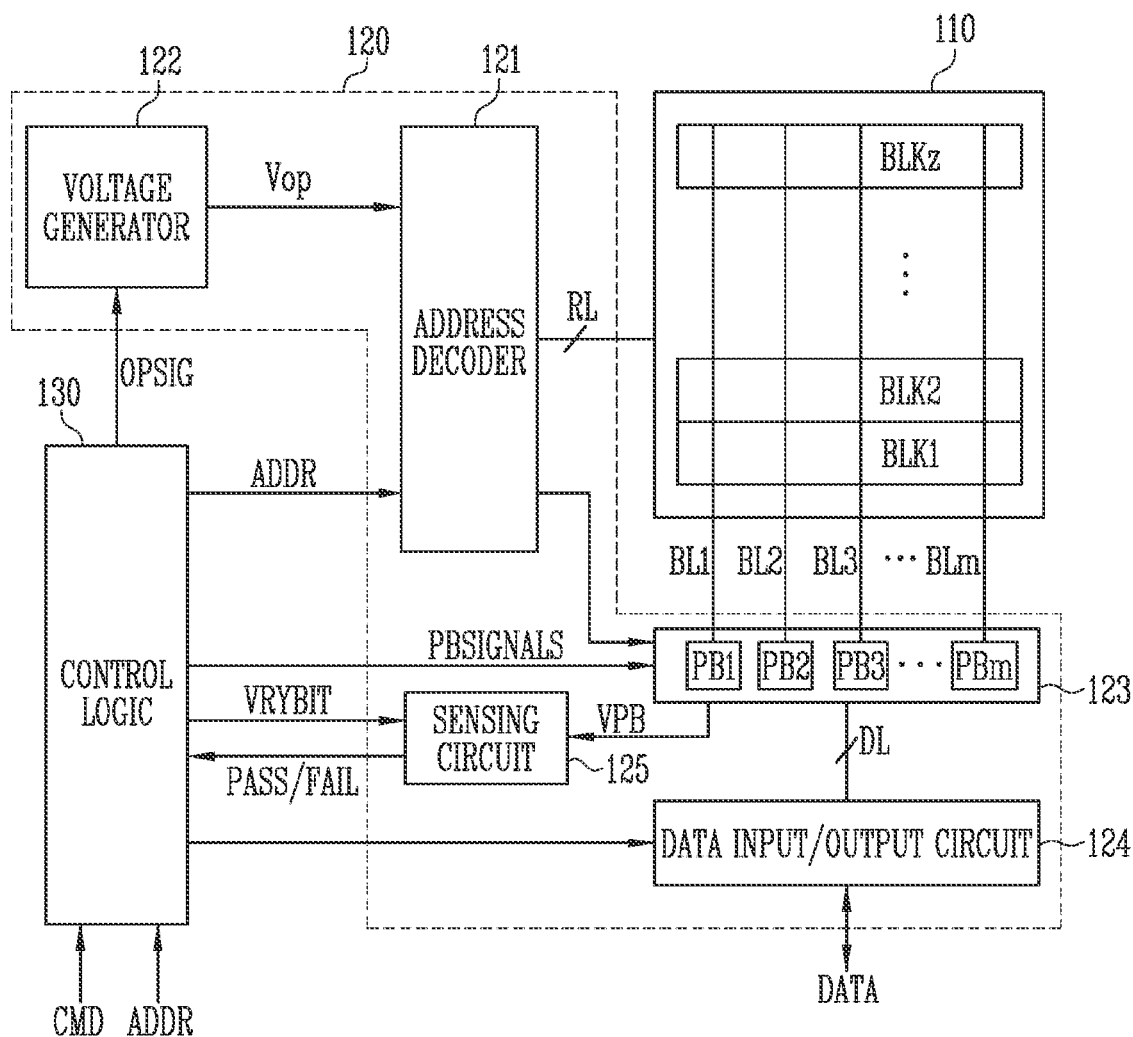
FIG. 20 is a diagram illustrating a memory die among a plurality of memory dies in accordance with an embodiment of the present disclosure.

FIG. 20 is a diagram illustrating a memory die among a plurality of memory dies in accordance with an embodiment of the present disclosure.

Referring to FIG. 20, the memory die 1000 may be one of the zeroth to seventh memory dies 101 to 108 shown in FIGS. 2 and 11. The memory die 1000 may include a memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. Memory cells connected to the same word line among the plurality of memory cells may be defined as one physical page. In an embodiment, a physical page may be a unit for storing data or reading stored data. One physical page may include a plurality of logical pages. A memory block may be a unit for erasing data.

Each of the memory cells of the memory die 1000 may be configured as a Single Level Cell (SLC) storing one-bit data, a Multi-Level Cell (MLC) storing two-bit data, a Triple Level Cell (TLC) storing three-bit data, a Quad Level Cell (QLC) storing four-bit data, or a memory cell storing five-or-more-bit data.

The peripheral circuit 120 may drive the memory cell array 110. For example, the peripheral circuit 120 may drive the memory cell array 110 to perform a program operation, a read operation, and an erase operation under the control of the control logic 130. In another example, the peripheral circuit 120 may apply various operating voltages to the row lines RL and the bit lines BL1 to BLm or discharge the applied voltages under the control of the control logic 130.

The peripheral circuit 120 may include the address decoder 121, a voltage generator 122, the page buffer group 123, a data input/output circuit 124, and a sensing circuit 125.

The address decoder 121 may be connected to the memory cell array 110 through the row lines RL. The row lines RL may include drain select lines, word lines, source select lines, and a source line.

The address decoder 121 may be operated under the control of the control logic 130. The address decoder 121 may receive an address ADDR from the control logic 130.

The address decoder 121 may decode a block address in the received address ADDR. The address decoder 121 may select at least one memory block among the memory blocks BLK1 to BLKz according to the decoded block address. The address decoder 121 may decode a row address in the received address ADDR. The address decoder 121 may select at least one word line WL of the selected memory block by applying voltages provided from the voltage generator 122 to the at least one word line WL according to the decoded row address.

In a program operation, the address decoder 121 may apply a program voltage to the selected word line, and apply a pass voltage having a level lower than a level of the program voltage to unselected word lines. In a program verify operation, the address decoder 121 may apply a verify voltage to the selected word line, and apply a verify pass voltage having a level higher than a level of the verify voltage to the unselected word lines.

In a read operation, the address decoder 121 may apply a read voltage to the selected word line, and apply a read pass voltage having a level higher than a level of the read voltage to the unselected word lines.

The address decoder 121 may decode a column address in the received address ADDR. The decoded column address may be transferred to the page buffer group 123. The address decoder 121 may include components such as a row decoder, a column decoder, and an address buffer.

The voltage generator 122 may generate a plurality of operating voltages Vop by using an external power voltage supplied to the memory device 100. The voltage generator 122 may be operated under the control of the control logic 130.

In an embodiment, the voltage generator 122 may generate various operating voltages Vop used for program, read, and erase operations in response to an operation signal OPSIG. For example, the voltage generator 122 may generate a plurality of erase voltages, a plurality of program voltages, a plurality of pass voltages, a plurality of select read voltages, and a plurality of unselect read voltages. The plurality of operating voltages Vop may be supplied to the memory cell array 110 by the address decoder 121.

The page buffer group 123 may include first to mth page buffers PB1 to PBm. The first to mth page buffers PB1 to PBm may be connected to the memory cell array 110 respectively through first to mth bit lines BL1 to BLm. The first to mth page buffers PB1 to PBm may be operated under the control of the control logic 130.

The first to mth page buffers PB1 to PBm may communicate data DATA with the data input/output circuit 124. In a program operation, the first to mth page buffers PB1 to PBm may receive data DATA to be stored through the data input/output circuit 124 and data lines DL.

In a program operation, the first to mth page buffers PB1 to PBm may transfer data DATA received through the data input/output circuit 124 to selected memory cells through the bit lines BL1 to BLm. The selected memory cells may be programmed according to the transferred data DATA. A memory cell connected to a bit line through which a program allow voltage (e.g., a ground voltage) is applied may have an increased threshold voltage. A threshold voltage of a memory cell connected to a bit line through which a program inhibit voltage (e.g., a power voltage) is applied may be maintained. In a verify operation, the first to mth page buffers PB1 to PBm may read data DATA stored in the selected memory cells from the selected memory cells through the bit lines BL1 to BLm.

In a read operation, the page buffer group 123 may read data DATA from memory cells of a selected page through the bit lines BL, and store the read data DATA in the first to mth page buffers PB1 to PBm.

The data input/output circuit 124 may be connected to the first to mth page buffers PB1 to PBm through the data lines DL. The data input/output circuit 124 may be operated under the control of the control logic 130.

The data input/output circuit 124 may include a plurality of input/output buffers (not shown) which receive input data DATA. In a program operation, the data input/output circuit 124 may receive data DATA to be stored from the memory controller 200. In a read operation, the data input/output circuit 124 may output, to the memory controller 200, data DATA transferred from the first to mth page buffers PB1 to PBm included in the page buffer group 123.

In a read operation or verify operation, the sensing circuit 125 may generate a reference current in response to an allow bit VRYBIT generated by the control logic 130, and output a pass or fail signal PASS/FAIL to the control logic 130 by comparing a sensing voltage VPB received from the page buffer group 123 with a reference voltage generated by the reference current. For example, the sensing circuit 125 may output the pass signal to the control logic 130 when a magnitude of the sensing voltage VPB is smaller than a magnitude of the reference voltage. In another example, the sensing circuit 125 may output the fail signal to the control logic 130 when the magnitude of the sensing voltage VPB is greater than the magnitude of the reference voltage.

The control logic 130 may be connected to the address decoder 121, the voltage generator 122, the page buffer group 123, the data input/output circuit 124, and the sensing circuit 125. The control logic 130 may control a general operation of the memory device 100. The control logic 130 may be operated in response to a command CMD transferred from the memory controller 200.

The control logic 130 may control the peripheral circuit 120 by generating several signals in response to a command CMD and an address ADDR. For example, the control logic 130 may generate the operation signal OPSIG, the address ADDR, a page buffer control signal PBSIG, and the allow bit VRYBIT in response to the command CMD and the address ADDR. The control logic 130 may output the operation signal OPSIG to the voltage generator 122, output the address ADDR to the address decoder 121, output the page buffer control signal PBSIG to the page buffer group 123, and output the allow bit VRYBIT to the sensing circuit 125. Also, the control logic 130 may determine whether the verify operation has passed or failed in response to the pass or fail signal PASS/FAIL output by the sensing circuit 125.

Figure 21:
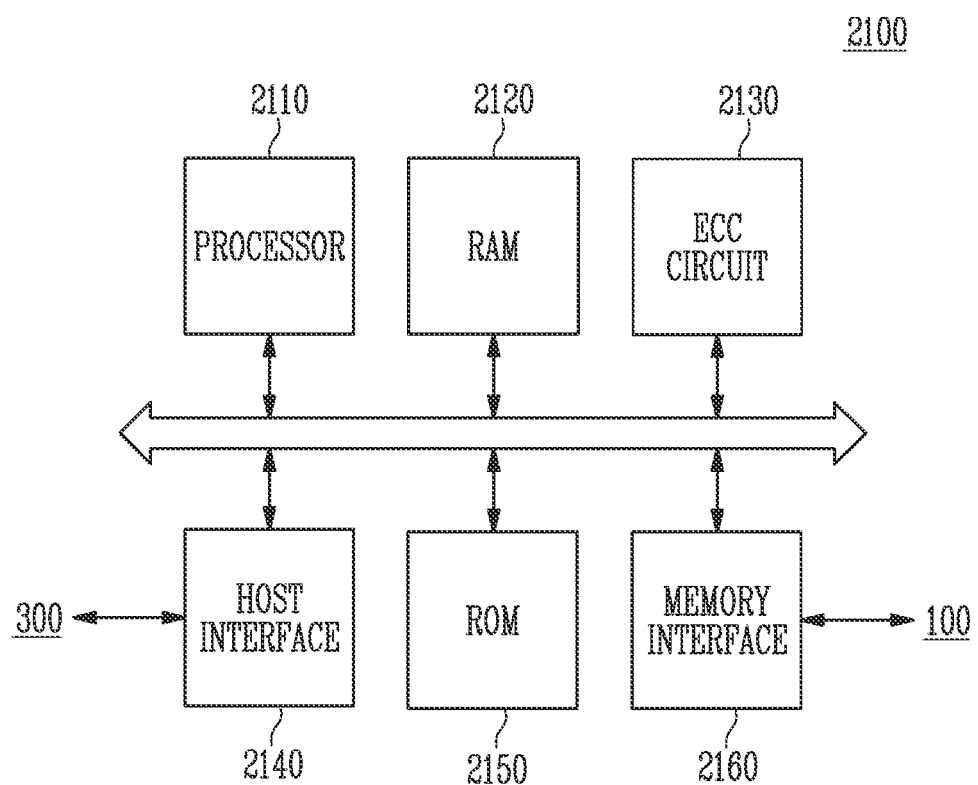
FIG. 21 is a diagram illustrating the memory controller shown in FIG. 1.

FIG. 21 is a diagram illustrating the memory controller shown in FIG. 1 in accordance with an embodiment of the present disclosure.

Referring to FIG. 21, a memory controller 2100 may include a processor 2110, a RAM 2120, an Error Correction Code (ECC) circuit 2130, a host interface 2140, a RAM 2150, and a memory interface 2160.

The processor 2110 may control a general operation of the memory controller 2100. The processor 2110 may control an operation of the memory controller 2100 to store data requested from the host 300 in the memory device 100. In an embodiment, the processor 2110 may include the processor 210 shown in FIG. 1. The processor 2110 may control a data movement operation of copying data from one memory block among a plurality of memory blocks to another memory block among the plurality of memory blocks, and update map data associated with the data movement operation. The data movement operation may include wear leveling, read reclaim or garbage collection.

The RAM 2120 may be used as a buffer memory, a cache memory, a working memory, or the like of the memory controller 2100. In an embodiment, the RAM 2120 may store a super block table and map data having a tree structure. The map data may include root nodes, die nodes, block nodes, and page nodes.

The ECC circuit 2130 may perform error correction. The ECC circuit 2130 may perform ECC encoding, based on data to be written in the memory device 100 through the memory interface 2160. The ECC-encoded data may be transferred to the memory device 100 through the memory interface 2160. The ECC circuit 2130 may perform ECC decoding on data received from the memory device 100 through the memory interface 2160.

The ROM 2150 may store, in a firmware form, various information required when the memory controller 2100 is operated.

The memory controller 2100 may communicate with an external device (e.g., the host 300, an application processor, or the like) through the host interface 2140. The memory controller 2100 may receive data provided through the host interface 2140. In an embodiment, the host interface 2140 may receive a read request from the host 300.

The memory controller 2100 may communicate with the memory device 100 through the memory interface 2160. The memory controller 2100 may transmit a command, an address, data, and the like to the memory device 100 through the memory interface 2160. The memory interface 2160 may provide the memory device 100 with a command for performing a data movement operation.

In accordance with the present disclosure, there can be provided a memory controller and a memory system, which can increase a speed at which map data used for an operation of the memory system is searched and stored.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A memory system comprising:
a plurality of memory dies each including a plurality of memory blocks each including a plurality of pages, each of the memory dies being configured to store therein map data having a tree structure; and
a memory controller configured to organize super blocks each including memory blocks from the respective memory dies, configured to control an operation of accessing a target memory block among the plurality of memory blocks and configured to update the map data according to the operation,
wherein the map data includes root nodes respectively identifying the super blocks, die nodes respectively identifying the plurality of memory dies, and page nodes respectively identifying the plurality of pages, and
wherein the memory controller identifies, based on a target block address of the target memory block, a target root node among the root nodes, corresponding to a target super block including the target memory block.

2. The memory system of claim 1, wherein the memory controller reads the target root node based on a super block table including addresses of the root nodes.

3. The memory system of claim 2, wherein the memory controller identifies, based on the target block address, a target die node among the die nodes, corresponding to a target memory die including the target memory block.

4. The memory system of claim 3, wherein the memory controller reads the target die node based on addresses of die nodes associated with the target root node.

5. The memory system of claim 4, wherein the memory controller reads a target page node corresponding to a target page in which the data is stored among the plurality of pages included in the target memory block, based on addresses of page nodes associated with the target die nodes and an address of the target page, and acquires from the target page node a map entry representing a target logical address mapped to the address of the target page.

6. The memory system of claim 5, wherein the memory controller maps the target logical address to an address of a second page in which the data is to be stored among the plurality of pages included in the second memory block.

7. The memory system of claim 4, wherein, after the operation, the memory controller sets unmap information in each of the target die node and page nodes associated with the target die node or erases the target die node and the page nodes associated with the target die node.

8. A memory controller comprising:
a buffer memory configured to store map data having a tree structure, the map data being read from a plurality of memory dies each including a plurality of memory blocks each including a plurality of pages; and
a processor configured to organize super blocks each including two or more of the plurality of memory blocks from each of the memory dies, and configured to control, based on the map data, an operation on a memory block among the plurality of memory blocks,
wherein the map data includes root nodes respectively identifying the super blocks, die nodes respectively identifying the plurality of memory dies, block nodes respectively identifying the plurality of memory blocks, and page nodes respectively identifying the plurality of pages, and
wherein the processor reads, based on a block address corresponding to a selected memory block of the memory blocks, a root node and a die node respectively representing a selected super block of the super blocks and a selected memory die of the memory dies both including the selected memory block.

9. The memory controller of claim 8, wherein the processor reads, based on the block address, a block node corresponding to the selected memory block among block nodes associated with the die node.

10. The memory controller of claim 9, wherein the processor reads data stored in a first page among the plurality of pages included in the selected memory block, and acquires a logical address corresponding to the address of the first page from a first page node corresponding to the first page among page nodes associated with the block node, the first page node being identified based on an address of the first page.

11. The memory controller of claim 9, wherein the processor stores, in the buffer memory, a page node including a map entry in which a logical address mapped to an address of a second page among the plurality of pages included in another memory block is mapped to an address of a first page among the plurality of pages included in the selected memory block, and stores, in the first page, data stored in the second page.

12. The memory controller of claim 10, wherein the processor:
stores, in the plurality of memory dies, the map data stored in the buffer memory in response to sudden power off; and
reads, in response to power-on, the root nodes from the plurality of memory dies into the buffer memory based on a super block table including addresses of the root nodes.

13. An operating method of a controller, the operating method comprising:
updating map data of a tree structure including a hierarchy of:
root nodes representing respective super blocks,
intermediate nodes for a corresponding root node of the root nodes and representing respective memory dies related to a corresponding super block of the super blocks, and
leaf nodes for a corresponding intermediate node of the intermediate nodes and representing respective pages included in a corresponding memory die of the memory dies,
wherein the updating the map data includes:

identifying, based on a memory block address, a selected root node of the root nodes and a selected intermediate node of the intermediate nodes corresponding to the selected root node;

identifying, based on a page address, a selected leaf node of the leaf nodes corresponding to the selected intermediate node; and updating an entry associated to the selected leaf node, the entry representing a mapping relationship between a logical address and the page address.

\* \* \* \* \*